(12) United States Patent
Mori et al.

(10) Patent No.: US 10,613,108 B2
(45) Date of Patent: Apr. 7, 2020

(54) AUTOMATIC ANALYZER

(71) Applicant: HITACHI HIGH-TECHNOLOGIES CORPORATION, Tokyo (JP)

(72) Inventors: Takamichi Mori, Tokyo (JP); Hitoshi Tokieda, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 394 days.

(21) Appl. No.: 15/556,081

(22) PCT Filed: Feb. 18, 2016

(86) PCT No.: PCT/JP2016/054764
§ 371 (c)(1),
(2) Date: Sep. 6, 2017

(87) PCT Pub. No.: WO2016/143478
PCT Pub. Date: Sep. 15, 2016

(65) Prior Publication Data
US 2018/0267068 A1  Sep. 20, 2018

(30) Foreign Application Priority Data

Mar. 10, 2015 (JP) ................. 2015-047286

(51) Int. Cl.
*G01N 35/04* (2006.01)
*G01N 35/02* (2006.01)
(Continued)

(52) U.S. Cl.
CPC ......... *G01N 35/04* (2013.01); *G01N 35/0099* (2013.01); *G01N 35/025* (2013.01);
(Continued)

(58) Field of Classification Search
None
See application file for complete search history.

(56) References Cited

U.S. PATENT DOCUMENTS

| 5,314,825 A | 5/1994 | Weyrauch et al. |
| 2005/0207938 A1* | 9/2005 | Hanawa ............. G01N 35/1002 422/64 |

(Continued)

FOREIGN PATENT DOCUMENTS

| CN | 1576849 A | 2/2005 |
| JP | 2004-264044 A | 9/2004 |

(Continued)

OTHER PUBLICATIONS

International Preliminary Report on Patentability received in corresponding International Application No. PCT/JP2016/054764 dated Sep. 21, 2017.

(Continued)

Primary Examiner — Kathryn Wright
(74) Attorney, Agent, or Firm — Mattingly & Malur, PC

(57) ABSTRACT

One actuator (a gripper mechanism and reagent bottle lid opening mechanism drive unit 120) drives a gripper mechanism 106 that holds a reagent bottle 10 and a reagent bottle lid opening mechanism 104 that incises a lid of the reagent bottle 10. The gripper mechanism 106 operates to ascend when the reagent bottle lid opening mechanism 104 operates to descend in order to incise the reagent bottle lid 112, and the reagent bottle lid opening mechanism 104 operates to ascend when the gripper mechanism 106 operates to descend in order to hold the reagent bottle 10. The reagent bottle lid opening mechanism 104 and the gripper mechanism 106 operate without interfering with each other's functions.

15 Claims, 17 Drawing Sheets

(51) Int. Cl.
*G01N 35/10* (2006.01)
*G01N 35/00* (2006.01)

(52) U.S. Cl.
CPC ..... *G01N 35/1002* (2013.01); *G01N 35/1079* (2013.01); *G01N 2035/0432* (2013.01); *G01N 2035/0437* (2013.01); *G01N 2035/0443* (2013.01); *G01N 2035/0465* (2013.01); *G01N 2035/0484* (2013.01); *G01N 2035/0491* (2013.01)

(56) References Cited

U.S. PATENT DOCUMENTS

| | | |
|---|---|---|
| 2006/0133965 A1 | 6/2006 | Tajima et al. |
| 2008/0199358 A1 | 8/2008 | Yamano |
| 2012/0301359 A1 | 11/2012 | Kraemer et al. |
| 2013/0243653 A1 | 9/2013 | Koiso et al. |
| 2016/0161521 A1* | 6/2016 | Sakairi ............... G01N 35/1002 422/67 |

FOREIGN PATENT DOCUMENTS

| | | |
|---|---|---|
| JP | 2005-037171 A | 2/2005 |
| JP | 2008-203004 A | 9/2008 |
| JP | 2010-175420 A | 8/2010 |
| JP | 2012-117916 A | 6/2012 |
| JP | 2013-500489 A | 1/2013 |

OTHER PUBLICATIONS

Chinese Office Action received in corresponding Chinese Application No. 201680013135.9 dated Apr. 1, 2019.
International Search Report of PCT/JP2016/054764 dated May 17, 2017.
Extended European Search Report received in corresponding European Application No. 16761450.2 dated Oct. 9, 2018.

* cited by examiner

116

AUTOMATIC ANALYZER

TECHNICAL FIELD

The present invention relates to an automatic analyzer that analyzes a reagent and a liquid sample, such as blood or urine, and particularly relates to an automatic analyzer that automatically performs carrying-in and carrying-out of a reagent.

BACKGROUND ART

As exemplary automatic analyzer that inhibits reagent deficiency from occurring during analysis to minimize analysis interruption, reducing the burden on an operator due to operations, such as reagent registration and reagent replacement, PTL 1 describes an automatic analyzer including: pairs of reagent containers provided in a line in a replenishing reagent storage cabinet including a replenishing second reagent storage unit above a reagent disk, the replenishing reagent storage cabinet being capable of being equipped with a plurality of reagent containers; a rail arranged on the replenishing reagent storage cabinet; and a reagent retaining unit and a reagent cap opening unit provided on the rail, the reagent retaining unit and the reagent cap opening unit being movable together with the rail in a triaxial direction.

CITATION LIST

Patent Literature

PTL 1: JP 2005-37171 A

SUMMARY OF INVENTION

Technical Problem

For example, an automatic analyzer, such as a biochemical automatic analyzer or an immunity automatic analyzer, is required to provide a reagent appropriate to an item to be measured for a patient sample, into the device. Generally, an operator manually provides a reagent bottle for providing the reagent into the device, to a reagent disk.

Replacement of a reagent bottle is typically made in a standby mode in which no measurement is basically performed by the device. For example, when the residual quantity of a reagent is small for an item to be measured, the following method is performed. A measurable count is previously grasped with the residual quantity of the reagent before the patent sample is measured. The same reagent bottle being a new article is additionally provided to the reagent disk, in a case where the residual quantity is small.

The reason is that addition of a reagent bottle or removal of the reagent bottle that has been empty may not be performed since the device operates during sample measurement. Thus, the operator is required to wait until the device completes the measurement and then is brought into the standby mode in a case where a reagent bottle is replenished while the residual quantity of the reagent is decreasing during the measurement. As a result, there are drawbacks in that operability degrades due to occurrence of waiting time to the operator and additionally loss occurs in measurement time.

When the reagent bottle is brought into an opened state in which a lid of the reagent has been removed, the reagent accelerates in degradation. In order to prevent the degradation, it has been known that a small incision is made in the lid of the reagent bottle and a reagent probe dispenses the reagent through the incision to be able to use the reagent in a stable state.

When the operator provides a plurality of reagent bottles to a reagent mounting mechanism in the device, the device automatically makes a small incision in a lid of a reagent bottle and provides the reagent bottle to the reagent disk so that the piercing of the lid of the reagent bottle is performed.

Here, it takes time for provision of reagent bottles since the operator sets the reagent bottles to the device one by one. Thus, there is a need to provide the reagent bottles grouped by a number to some extent to successively carry the reagent bottles into the reagent disk.

Since the miniaturization of the device in size has recently progressed, when a plurality of mechanisms is intricately arranged into the automatic analyzer including the reagent retaining unit and the reagent cap opening unit provided, described in Patent Literature 1 above, a provision space increases and the number of components increases.

That is, the configuration of the device becomes intricate so that a risk, such as a failure, is estimated to increase.

An object of the present invention is to provide an automatic analyzer capable of reducing the burden on an operator with minimization of a provision space for a mechanism and reduction of constituent components.

Solution to Problem

In order to solve the problem, for example, the configurations described in the claims are adopted.

The present invention includes a plurality of units that solves the problem, and is to provide, as an example, an automatic analyzer configured to dispense a sample and a reagent to each of a plurality of reaction containers to react the sample and the reagent, the automatic analyzer configured to measure a liquid that has reacted, the automatic analyzer including: a reagent disk configured to store a reagent bottle that has housed the reagent; a reagent mounting unit configured to be provided with the reagent bottle in loading the reagent bottle into the automatic analyzer; and a reagent conveying unit including a gripper unit that holds the reagent bottle and a reagent bottle lid opening unit that makes a hole in a lid of the reagent bottle, the reagent conveying unit configured to convey the reagent bottle that has been provided to the reagent mounting unit, into the reagent disk. A gripper unit and reagent bottle lid opening unit drive unit coordinates and drives the gripper unit and the reagent bottle lid opening unit in the reagent conveying unit, mutually and reversely in an upper and lower direction.

Advantageous Effects of Invention

According to the present invention, the miniaturization of the provision space of the mechanism and the reduction of the constituent components can be achieved so that the operation efficiency of the operator can be achieved.

DESCRIPTION OF EMBODIMENTS

An automatic analyzer according to an embodiment of the present invention will be described with FIGS. 1 to 17.

Figure 1:
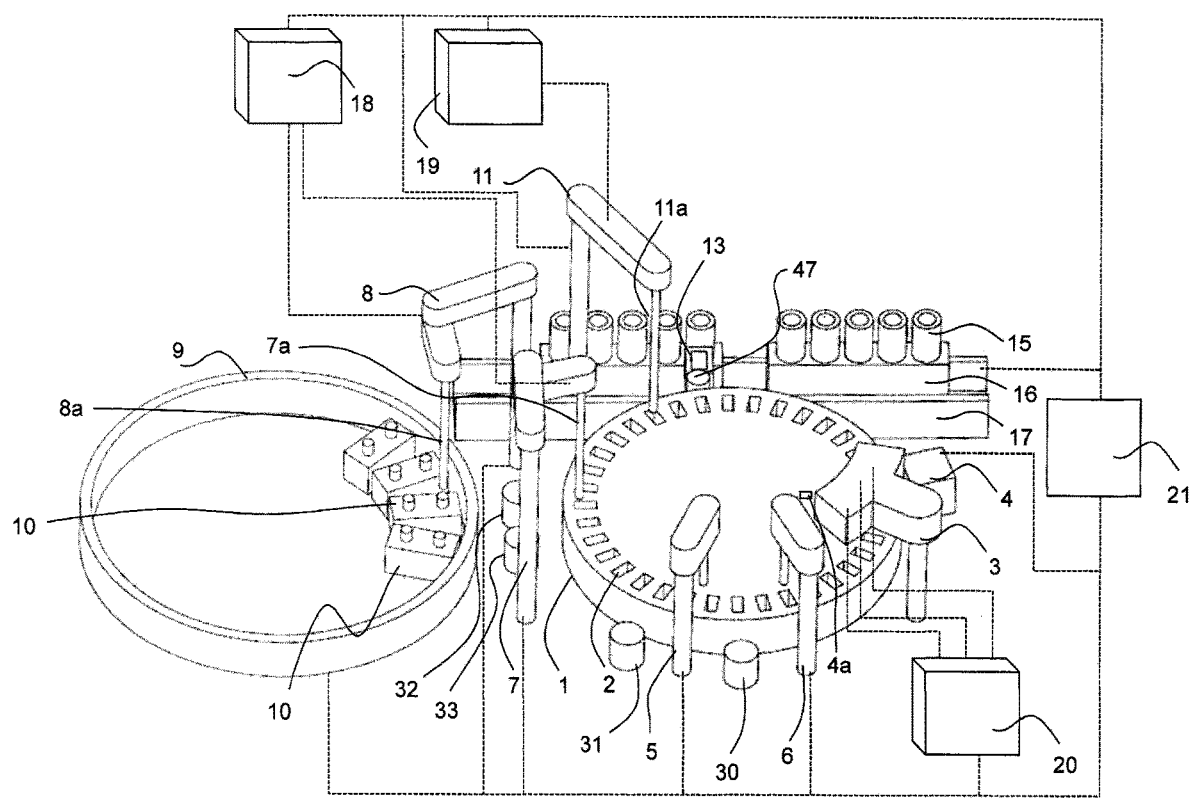
FIG. 1 is a schematic view of an entire configuration of a typical automatic analyzer.

FIG. 1 is a perspective view of the automatic analyzer according to the present embodiment.

In FIG. 1, the automatic analyzer dispenses a sample and a reagent to each of a plurality of reaction containers 2 and reacts the sample and the reagent so as to measure a liquid that has reacted. The automatic analyzer includes a reaction disk 1, a reagent disk 9, a sample conveying mechanism 17, reagent dispensing mechanisms 7 and 8, a reagent syringe 18, a sample dispensing mechanism 11, a sample syringe 19, a cleaning mechanism 3, a light source 4a, a spectrophotometer 4, stirring mechanisms 5 and 6, a cleaning pump 20, cleaning tanks 13, 30, 31, 32, and 33, a controller 21, and an autoloader mechanism 100 (refer to FIG. 2).

The reaction disk 1 includes the reaction containers 2 arranged on the circumference of a circle. The sample conveying mechanism 17 that moves a rack 16 including a sample container 15 mounted, is provided near the reaction disk 1.

The sample dispensing mechanism 11 rotatable and movable upward and downward, is provided between the reaction disk 1 and the sample conveying mechanism 17, and includes a sample probe 11a. The sample syringe 19 is coupled to the sample probe 11a. The sample probe 11a moves in an arc of a circle around a rotational axis so as to perform sample dispensing from the sample container 15 to a reaction container 2.

A plurality of reagent bottles 10 can be mounted on the circumference of a circle in the reagent disk 9. The reagent disk 9 is kept cool and is covered with a cover provided with a suction port 111 (refer to FIG. 2).

The reagent dispensing mechanisms 7 and 8 rotatable and movable upward and downward, are provided between the reaction disk 1 and the reagent disk 9, and include a reagent probe 7a and a reagent probe 8a, respectively. The reagent syringe 18 is coupled to the reagent probes 7a and 8a. The reagent probes 7a and 8a each move in an arc of a circle around a rotational axis and access the inside of the reagent disk 9 through the suction port 111 so as to dispense a reagent from a reagent bottle 10 to the reaction container 2.

The cleaning mechanism 3, the light source 4a, the spectrophotometer 4, and the stirring mechanisms 5 and 6 are further arranged on the periphery of the reaction disk 1. The cleaning pump 20 is coupled to the cleaning mechanism 3. The cleaning tanks 13, 30, 31, 32, and 33 are provided in ranges in which the reagent dispensing mechanisms 7 and 8, the sample dispensing mechanism 11, and the stirring mechanisms 5 and 6 operate, respectively. The sample container 15 contains a sample to be examined (an analyte), such as blood, and is carried by the sample conveying mechanism 17, the sample container 15 being mounted on the rack 16. Each mechanism is coupled to the controller 21.

The controller 21 includes a computer, and controls the operation of each mechanism in the automatic analyzer and additionally performs arithmetic processing of acquiring the concentration of a predetermined component in a liquid sample, such as blood or urine.

The typical configuration of the automatic analyzer has been described above.

Analysis processing of the sample to be examined, by the automatic analyzer described above, is typically performed in accordance with the following order.

First, the sample probe 11a of the sample dispensing mechanism 11 dispenses the sample in the sample container 15 mounted on the rack 16 conveyed near the reaction disk 1 by the sample conveying mechanism 17, to the reaction container 2 on the reaction disk 1. Next, the reagent to be used for the analysis is dispensed from the reagent bottle 10 on the reagent disk 9 to the reaction container 2 containing the sample dispensed previously by the reagent dispensing mechanisms 7 and 8. Subsequently, the stirring mechanism 5 stirs a liquid mixture of the sample and the reagent in the reaction container 2.

After that, light generated from the light source 4a, is transmitted through the reaction container 2 containing the liquid mixture so that the spectrophotometer 4 measures the intensity of the transmitted light. The intensity measured by the spectrophotometer 4 is transmitted to the controller 21 through an A/D converter and an interface. Then, the controller 21 performs the calculation so as to acquire the concentration of the predetermined component in the liquid sample, such as blood or urine. Then, a display unit (not illustrated) displays a result.

Next, a configuration of the autoloader mechanism 100 will be described with reference to FIG. 2 and the subsequent figures.

As described above, a lid 112 is attached to the reagent probe suction port position of the reagent bottle 10 so as to hermetically seal the inside. When being set into the automatic analyzer, the reagent bottle 10 is provided into the device with the lid 112 typically removed. However, recently, there is provided a method including: making a hole having an incised shape into the lid 112; inserting the reagent probes 7a and 8a into an incised portion; and sucking the reagent in the reagent bottle 10. Since the opening of the lid 112 includes a slight incision, the reagent is in contact with the outside air at a minimum. Thus, the reagent is inhibited from degrading in comparison to the conventional case. In this case, once an operator provides an unopened new reagent bottle 10 into the automatic analyzer, a hole is made in the lid 112 of the reagent bottle 10 and then the reagent bottle 10 is automatically provided to the reagent disk 9. The autoloader mechanism 100 achieves the processing.

Figure 2:
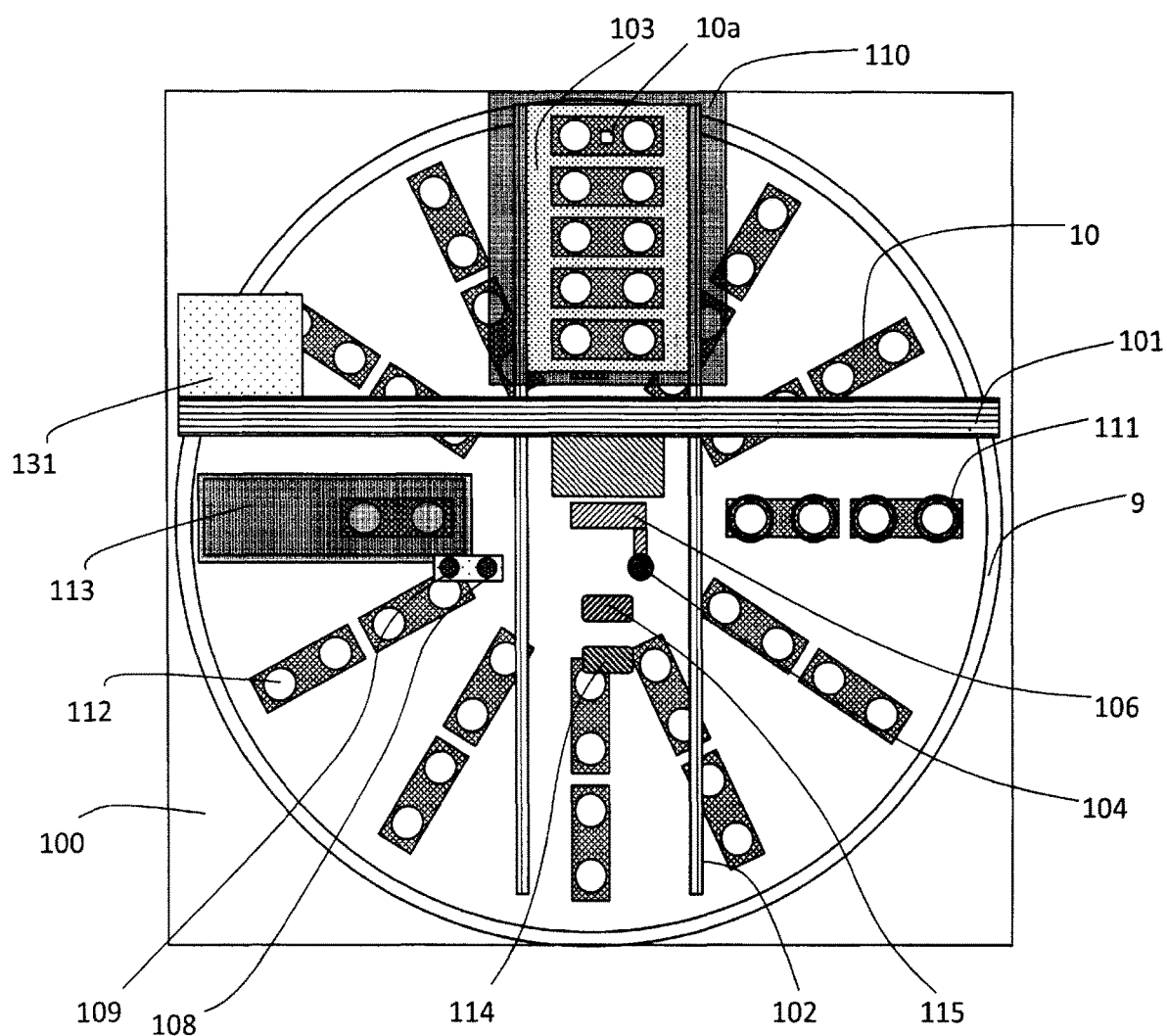
FIG. 2 is a schematic view for describing an exemplary autoloader mechanism provided to an automatic analyzer according to an embodiment of the present invention.

The autoloader mechanism 100 is arranged on an upper portion of the reagent disk 9, and has a configuration illustrated in FIG. 2. In FIG. 2, the autoloader mechanism 100 includes a reagent mounting unit 103, a reagent mounting mechanism 102, a reagent conveying mechanism (a reagent conveying unit) 101, a needle cleaning tank 108, a needle drying port 109, a reagent disk opening/closing cover 113, a bottle orientation detecting sensor 114, and a RFID sensor 115.

Figure 3:
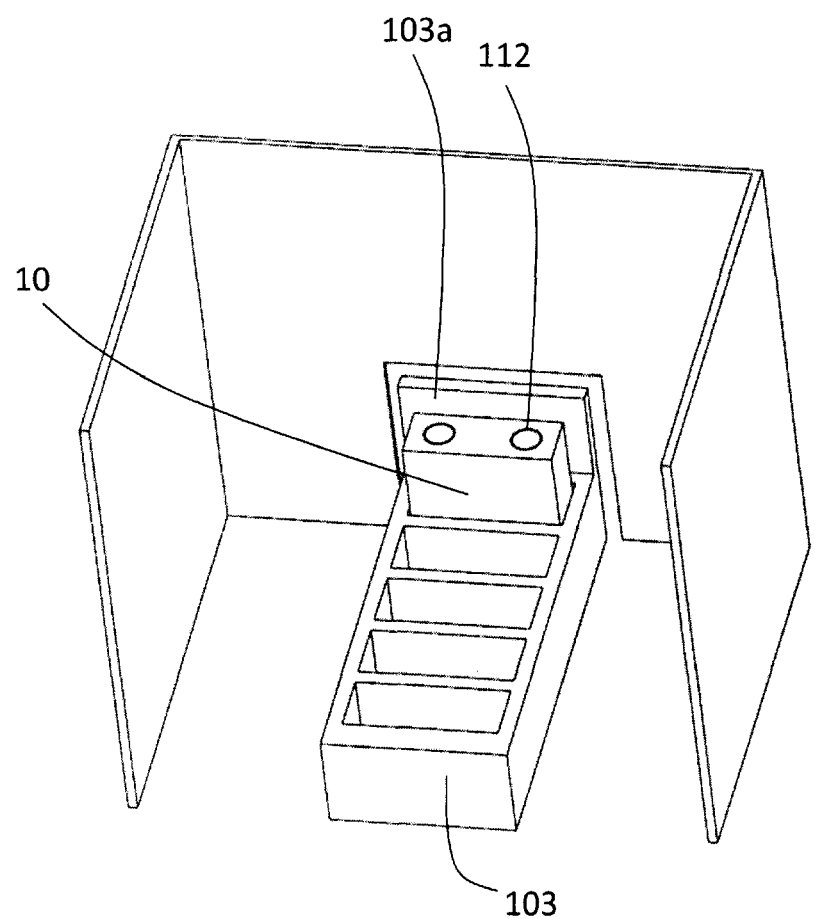
FIG. 3 is a schematic view for describing a reagent conveying mechanism in replacing a reagent bottle in the automatic analyzer according to the embodiment of the present invention.

As illustrated in FIG. 3, the reagent mounting unit 103 includes a portion to which a reagent bottle 10 is provided in loading the reagent bottle 10 into the automatic analyzer. The reagent mounting unit 103 is operated by the reagent mounting mechanism 102 in an upper and lower direction in FIG. 2. The reagent mounting unit 103 has a structure in which a plurality of reagent bottles 10 can be linearly provided, and includes, for example, a tray having a plurality of reagent bottle slots 107 into which the reagent bottles 10 are provided. A reagent buffer 110 includes a standby unit that temporarily retains a reagent bottle 10 provided to the reagent mounting unit 103, before the reagent bottle 10 is carried in the reagent disk 9.

The reagent mounting mechanism 102 includes the reagent mounting unit 103 movable, with the power of a motor, on a rail along a guide provided between a position at which the reagent bottle 10 is loaded into the device, and the reagent buffer 110.

The reagent conveying mechanism 101 conveys the reagent bottle 10 provided to the reagent mounting unit 103, into the reagent disk 9. The reagent conveying mechanism 101 includes, as constituent components, a gripper mechanism (a gripper unit) 106 that holds the reagent bottle 10, a reagent bottle lid opening mechanism (a reagent bottle lid opening unit) 104 that makes a hole in the lid 112 of the reagent bottle 10, a gripper mechanism and reagent bottle lid opening mechanism drive unit (a gripper unit and reagent bottle lid opening unit drive unit) 120, and a horizontal drive motor 131 that drives the gripper mechanism 106 and the reagent bottle lid opening mechanism 104 in a left and right direction in FIG. 2.

The reagent conveying mechanism 101 operates in the left and right direction in FIG. 2 between the reagent mounting unit 103 and a reagent disk opening (the reagent disk opening/closing cover 113) in position in FIG. 2. That is, the reagent mounting unit 103 moves in the upper and lower direction in FIG. 2 and the reagent conveying mechanism 101 operates in a horizontal direction in FIG. 2 so that the reagent mounting unit 103 is orthogonal to the reagent conveying mechanism 101 in operation direction. The reagent conveying mechanism 101 has the position at which the gripper mechanism 106 holds the reagent bottle 10 and the position at which the reagent bottle 10 is carried in or carried out of the reagent disk 9, arranged linearly.

The reagent bottle lid opening mechanism 104 includes a needle 105 that incises the lid 112 of the reagent bottle (refer to FIG. 4) attached. The reagent bottle lid opening mechanism 104 performs cleaning of the needle 105 that has incised the lid 112, in the needle cleaning tank 108 arranged in parallel to the operation direction of the reagent conveying mechanism 101. In the next process, cleaning water is removed through the needle drying port 109 arranged in parallel to the operation direction of the reagent conveying mechanism 101. Thus, the reagent is inhibited from being diluted by the cleaning water when the lid 112 of the reagent bottle is incised. As illustrated, the needle cleaning tank 108 and the needle drying port 109 are arranged in parallel to the operation direction of the reagent conveying mechanism 101.

The gripper mechanism 106 includes claws that hold the reagent bottle 10, and seizes a notch of the reagent bottle 10 with the claws so as to hold the reagent bottle 10.

A configuration of the gripper mechanism and reagent bottle lid opening mechanism drive unit 120, will be described with reference to FIG. 4, the gripper mechanism and reagent bottle lid opening mechanism drive unit 120 configured to coordinate and drive the reagent bottle lid opening mechanism 104 and the gripper mechanism 106 being constituent components of the reagent conveying mechanism 101, mutually and reversely in the upper and lower direction.

Figure 4:
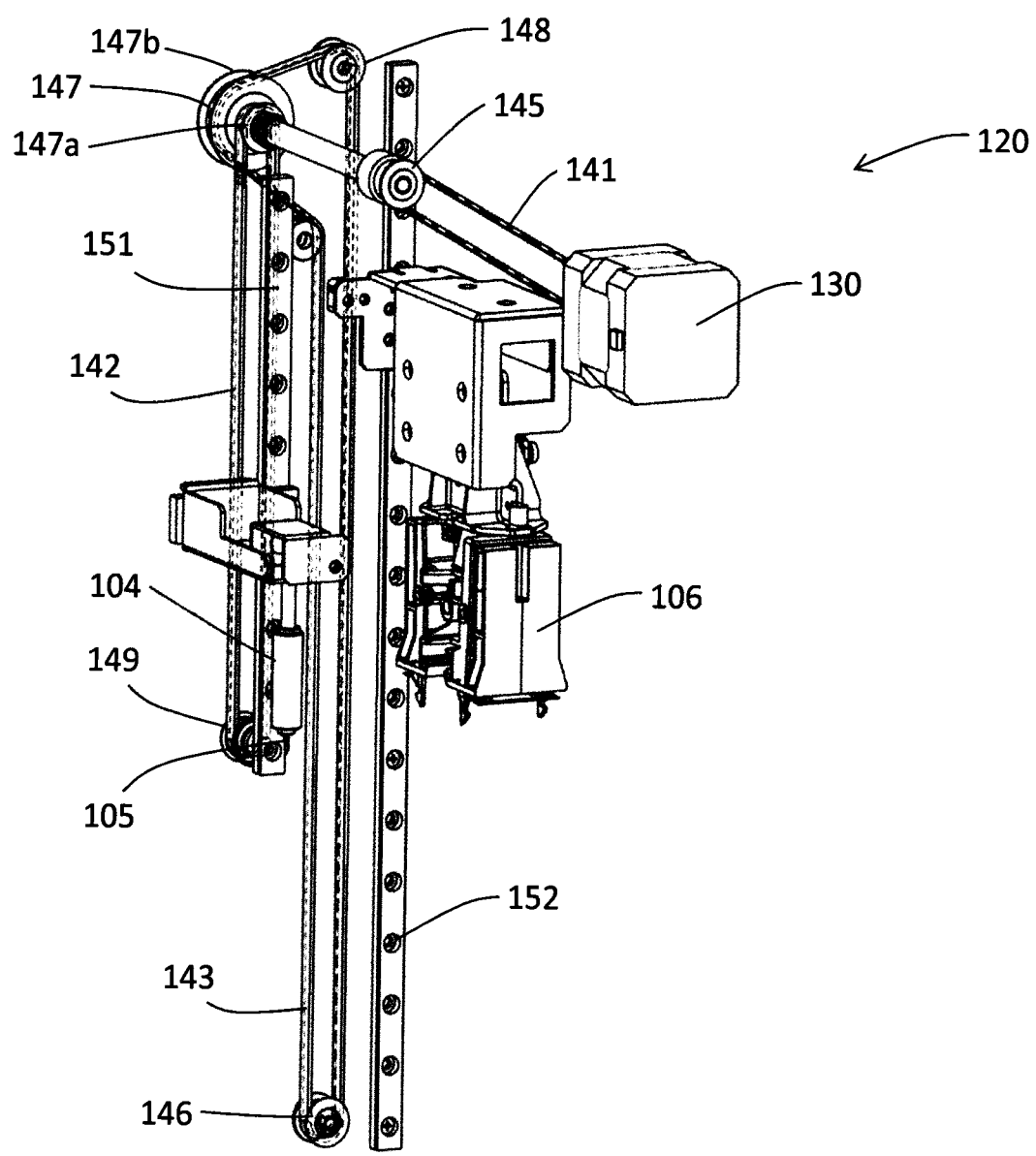
FIG. 4 is a schematic view for describing exemplary configurations of a reagent bottle lid opening mechanism and a gripper mechanism in the automatic analyzer according to the embodiment of the present invention.

As illustrated in FIG. 4, the gripper mechanism and reagent bottle lid opening mechanism drive unit 120 includes: one upward and downward drive motor 130; a belt A 141 coupled to the upward and downward drive motor 130; a pulley A 145 that rotates in coordination with the upward and downward drive motor 130 through the belt A 141; a pulley C 147 including a first pulley portion 147a and a second pulley portion 147b that coaxially rotate in coordination with the pulley A 145; a belt B 142 coupled to the first pulley portion 147a of the pulley C 147 and the reagent bottle lid opening mechanism 104; a belt C 143 coupled to the second pulley portion 147b of the pulley C 147 and the gripper mechanism 106; a linear guide A 151 that guides the reagent bottle lid opening mechanism 104 in a vertical direction; and a linear guide B 152 that guides the gripper mechanism 106 in the vertical direction.

The gripper mechanism and reagent bottle lid opening mechanism drive unit 120 includes the gripper mechanism 106 and the reagent bottle lid opening mechanism 104 operable mutually and reversely in the upper and lower direction when the one upward and downward drive motor 130 drives.

More specifically, when the upward and downward drive motor 130 rotates, the pulley A 145 rotates through the belt A 141. The pulley A 145 has the pulley C 147 coaxially fitted so that the pulley C 147 rotates in synchronization with the rotation of the pulley A 145.

The pulley C 147 has a structure including the first pulley portion 147a to which the belt B 142 has been fitted and the second pulley portion 147b to which the belt C 143 has been fitted, integrally formed, the first pulley portion 147a and the second pulley portion 147b being different from each other in diameter. As illustrated in FIG. 4, the reagent bottle lid opening mechanism 104 and the gripper mechanism 106 are fitted to the belt B 142 and the belt C 143, respectively, to position the reagent bottle lid opening mechanism 104 above the gripper mechanism 106 when the gripper mechanism 106 holds the reagent bottle 10 and to position the gripper mechanism 106 above the reagent bottle lid opening mechanism 104 when the reagent bottle lid opening mechanism 104 opens the lid of the reagent bottle 10.

Therefore, when the upward and downward drive motor 130 rotates, a pulley E 149 rotates through the belt B 142 due to the rotation of the first pulley portion 147a of the pulley C 147, and then the reagent bottle lid opening mechanism 104 fitted to the belt B 142 moves in the upper and lower direction. Simultaneously, a pulley B 146 rotates through the belt C 143 due to the rotation of the second pulley portion 147b of the pulley C 147 so that the gripper mechanism 106 fitted to the belt C moves in the upper and lower direction reversely to the reagent bottle lid opening mechanism 104.

The linear guide A 151 and the linear guide B 152 are arranged in parallel, and separating the mutual distance can access the reagent bottle 10 arranged in the reagent mounting unit 103 in the left and right direction in FIG. 4.

Note that, the reagent bottle lid opening mechanism 104 is arranged out of contact with the lid of the reagent bottle 10 when the gripper mechanism 106 holds the reagent bottle 10. However, shortening the interval between the linear guide A 151 and the linear guide B 152, can make the gripper mechanism 106 and the reagent bottle lid opening mechanism 104 operable side by side to the reagent bottle 10 arranged in the reagent mounting unit 103.

As illustrated in FIG. 4, varying the pulley A 145, the pulley B 146, the pulley C 147, a pulley D 148, and the pulley E 149 to be used, in diameter varies the reagent bottle lid opening mechanism 104 and the gripper mechanism 106 in the amount of upward and downward movement.

In particular, the respective diameters of the first pulley portion 147a and the second pulley portion 147b are desirably different from each other from the viewpoint of varying the amount of the movement of each mechanism. In the example of FIG. 4, the diameter of the second pulley portion 147b is larger than the diameter of the first pulley portion 147a. As a result, the amount of the upward and downward movement of the gripper mechanism 106 is larger than the amount of the upward and downward movement of the reagent bottle lid opening mechanism 104, with respect to the rotational operation of the upward and downward drive motor 130. In particular, the gripper mechanism 106 descends more significantly than the reagent bottle lid opening mechanism 104 in order to carry the reagent bottle 10 into the reagent disk 9. Relatively making the diameter of the pulley portion according to the mechanism having a larger amount of descent large, can inhibit the linear guide from being excessively elongated in the vertical direction. Accordingly, the gripper mechanism and reagent bottle lid opening mechanism drive unit 120 can be inhibited from excessively increasing in height. Note that, if the magnitude relationship between the first pulley portion 147a and the second pulley portion 147b is reversed, the amount of ascent with which the reagent bottle lid opening mechanism 104 ascends, becomes larger than the amount of descent with which the gripper mechanism 106 descends when carrying the reagent bottle 10 into the reagent disk 9. Thus, the linear guide A 151 is required to be more elongated than that illustrated in the figure so that the problem described above may occur. In this manner, varying the reagent bottle lid opening mechanism 104 and the gripper mechanism 106 in upward and downward resolution, can set the amount of the movement required as a function for each mechanism and, for example, can contribute to miniaturization of the mechanisms.

Referring back to FIG. 2, the bottle orientation detecting sensor 114 and the RFID sensor 115 are arranged on the operation of the reagent mounting mechanism 102. The bottle orientation detecting sensor 114 measures whether the reagent bottle 10 has been provided and the provision direction of the reagent bottle 10. The RFID sensor 115 acquires information on the reagent in the reagent bottle 10 recorded in a RFID tag 10a provided to the reagent bottle 10.

The reagent disk opening/closing cover 113 prevents cool air inside the reagent disk 9 that has been kept cool from escaping, and is normally closed. When the reagent conveying mechanism 101 accesses the reagent disk 9, the reagent disk opening/closing cover 113 opens and operates so that the reagent bottle 10 can be carried in and carried out of the reagent disk 9.

The configuration of the autoloader mechanism 100 has been described above.

The operation from provision of a new reagent bottle 10 to carrying of the reagent bottle 10 into the reagent disk 9 with the autoloader mechanism 100, will be described with FIGS. 5 to 10.

Figure 5:
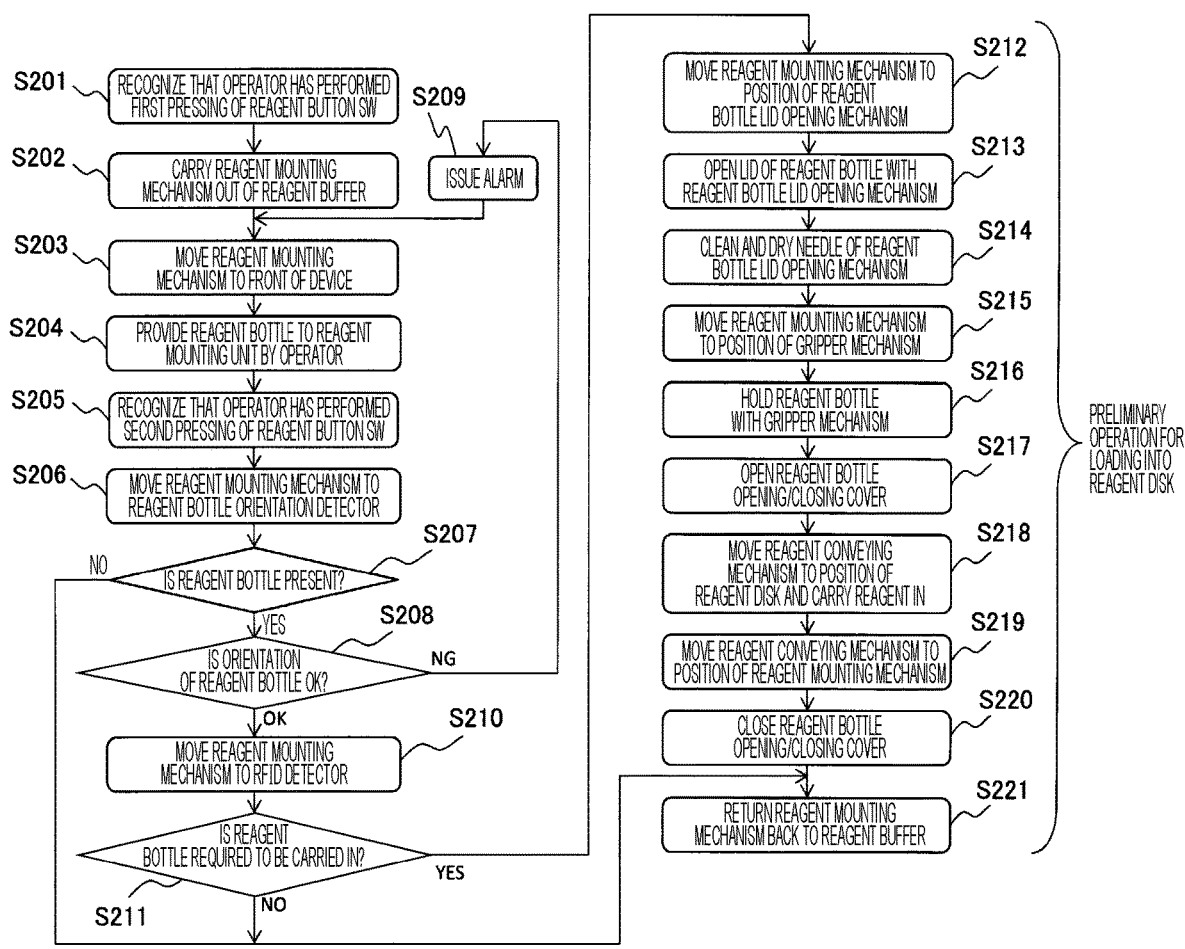
FIG. 5 is a flowchart for describing a reagent carrying-in operation in the automatic analyzer according to the embodiment of the present invention.

In FIG. 5, in a case where desirably carrying the new reagent bottle 10 into the reagent disk 9 of the device, the operator first performs a first pressing of a reagent button switch (not illustrated) of the device. The device recognizes that the operator has performed the first pressing of the reagent button switch (step S201). As a result, the reagent mounting mechanism 102 operates so that the reagent mounting unit 103 is carried out from the reagent buffer 110 (step S202), and then the reagent mounting unit 103 moves to the near side of the device as illustrated in FIG. 6 (a lower portion in FIG. 6) (step S203).

Here, the autoloader mechanism 100 has a structure in which no access can be made to the inside of the device normally due to an interlock. When the operator provides the reagent bottle 10 to the reagent mounting unit 103, the interlock mechanism of a reagent mounting unit cover 116 is released after the reagent mounting unit 103 moves to the front of the device and then the operator opens the reagent mounting unit cover 116 illustrated in FIG. 7 to provide the reagent bottle 10 to an empty reagent bottle slot 107 in the reagent mounting unit 103. In a case where the reagent mounting unit cover 116 is opened, as illustrated in FIG. 3, the inside is covered with a cover, and an opening portion having a size through which the reagent mounting unit 103 can pass, is only provided. Therefore, no access can be made to the inside of the autoloader mechanism 100. A wall 103a is provided high on the rear side of the reagent mounting unit 103 so that no access can be made to the inside of the autoloader mechanism 100 even in a case where no reagent bottle is present. The height of the wall 103a is desirably made to be equivalent to the height of the reagent bottle 10 that has been provided or higher than the height of the reagent bottle 10 that has been provided. This is because making the height of the wall 103a equivalent to or higher than the height of the reagent bottle 10 that has been provided, further reduces a possibility that the operator accesses the inside of the autoloader mechanism 100 due to a gap large in quantity in a case where no reagent bottle 10 has been provided. With the configuration illustrated in FIG. 3, the operator can perform a reagent replacement operation even while the device is performing analysis.

Figure 6:
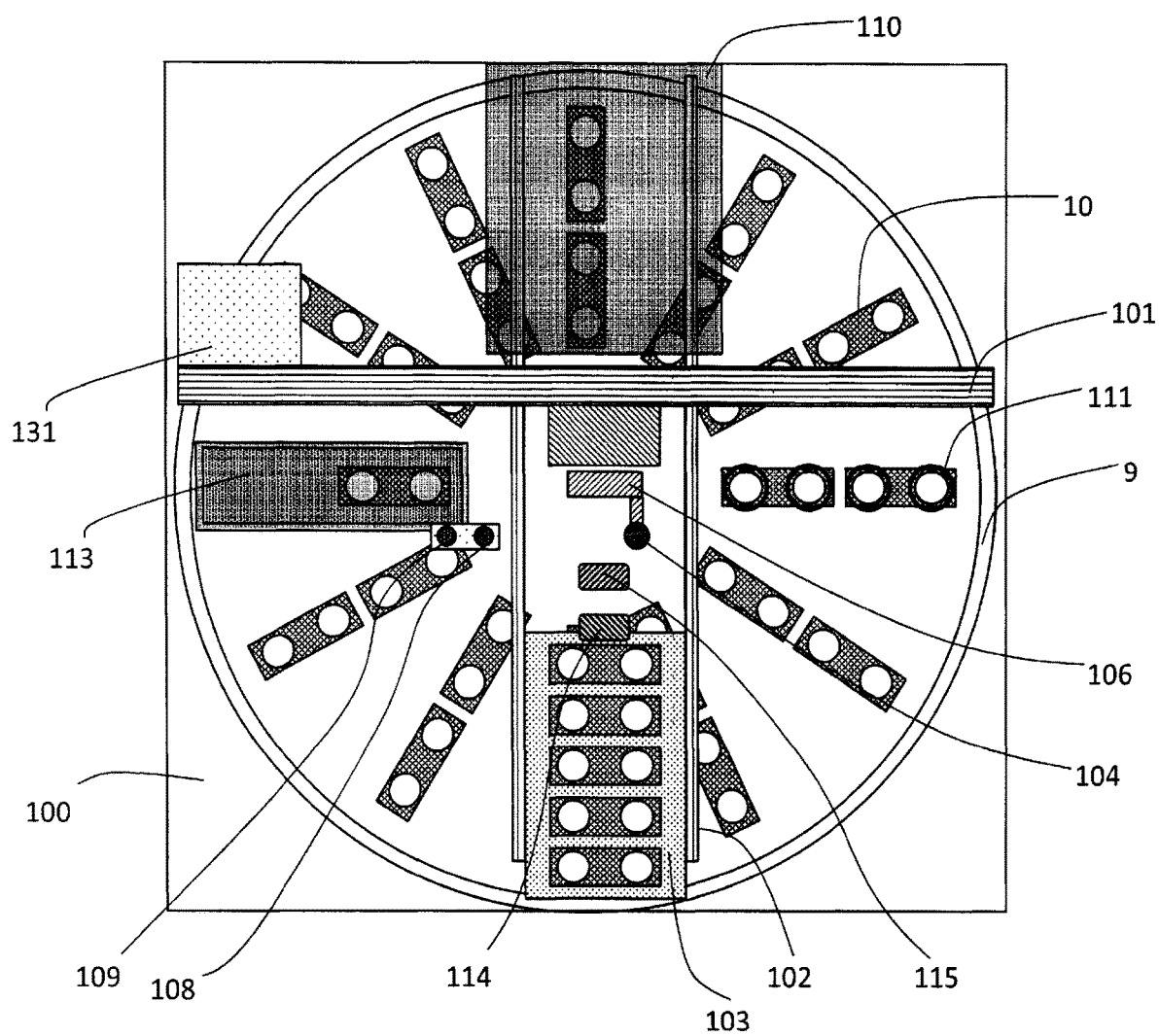
FIG. 6 is a schematic view for describing an exemplary operation of an autoloader mechanism provided to the automatic analyzer according to the embodiment of the present invention.
Figure 7:
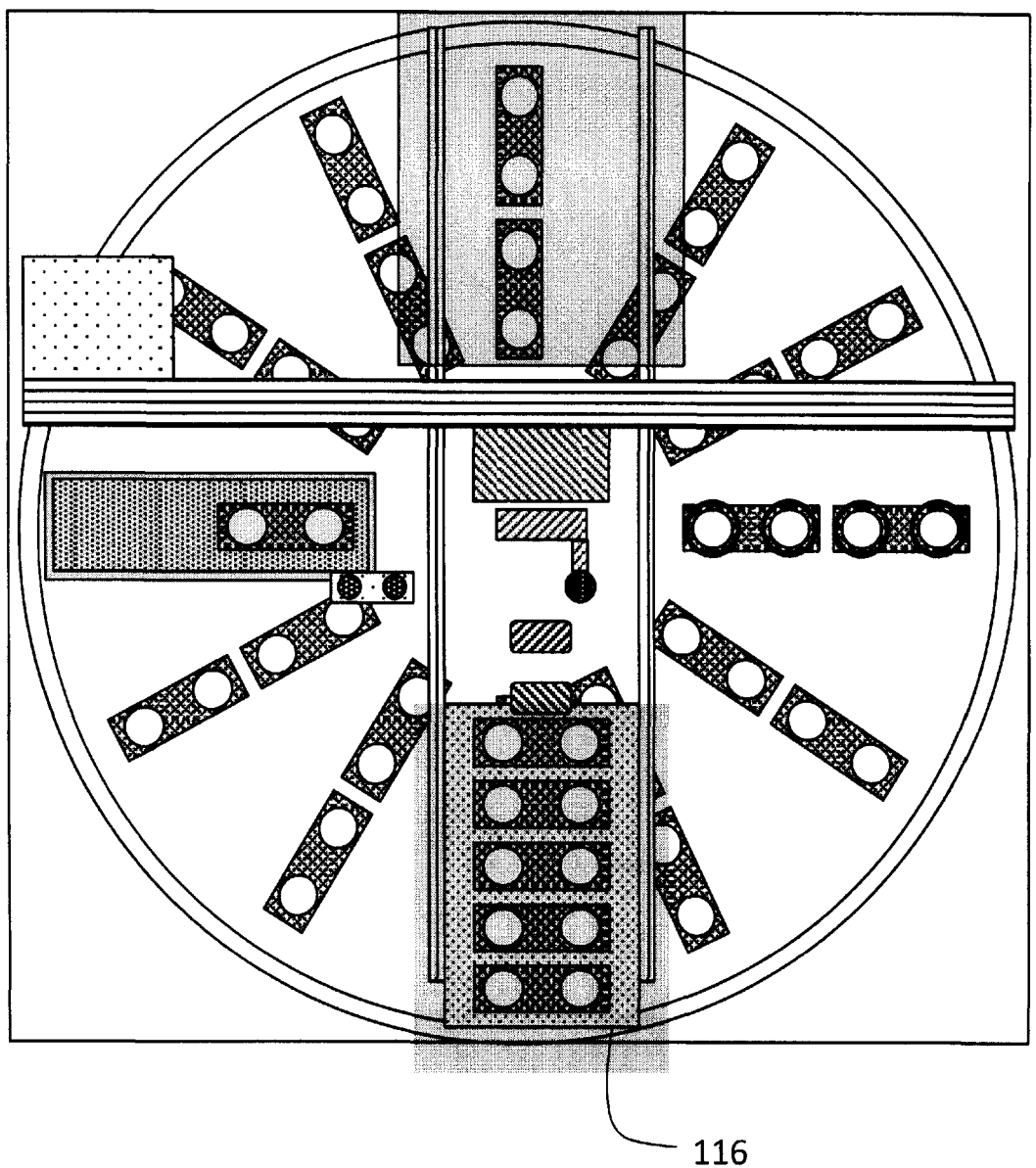
FIG. 7 is a schematic view for describing an exemplary operation of the autoloader mechanism provided to the automatic analyzer according to the embodiment of the present invention.

As illustrated in FIG. 6, after the reagent mounting unit 103 arrives at the front of the device, the interlock of the reagent mounting unit cover 116 is released. After that, the operator opens the reagent mounting unit cover 116 and provides the reagent bottle 10 to the reagent mounting unit 103 (step S204). After providing the reagent bottle 10 required in number to the reagent mounting unit 103, the operator closes the reagent mounting unit cover 116 and then presses the reagent button switch again. The device recognizes that the operator has performed the second pressing of the reagent button switch (step S205).

For convenience of the description, the operation will be described in a case where, with five number of the reagent bottle slots 107 for providing the reagent bottle 10 to the reagent mounting unit 103, the operator provides the reagent bottle forward and backward so that three number of the reagent bottle slots 107 have been empty between the front and the rear. In FIG. 3, the reagent bottle provided on the far side is defined as a reagent bottle 10A, and the reagent bottle provided on the near side is defined as a reagent bottle 10B.

After the device recognizes that the operator has pressed the button switch, the reagent mounting unit 103 moves so as to pass under the bottle orientation detecting sensor 114 (step S206). At this time, the bottle orientation detecting sensor 114 measures the orientation of the provision direction of the reagent bottle 10 and whether the reagent bottle has been provided, sequentially from the reagent bottle 10A to the reagent bottle 10B so that whether the reagent bottle 10 has been provided is determined (step S207). When it is determined that the provision has been made, the processing proceeds to step S208. When it is determined that no provision has been made, the processing proceeds to step S221.

Next, the orientation of the provision of the reagent bottle 10 is determined (step S208). When it is determined that the provision has been correctly made (OK), the processing proceeds to step S210. When it is determined that the provision has been made wrong (NG), the processing proceeds to step S209. The orientation of the provision of the reagent bottle 10 can be determined, for example, by sticking a black-and-white label on the reagent bottle 10 and determining the orientation of white and black with a sensor. A reflective sensor or a beam sensor is arranged so as to measure whether light is shielded so that the presence or absence of the reagent bottle 10 can be also determined.

When it is determined at step S208 that the provision direction of the reagent bottle 10 has been reversed, the reagent mounting unit 103 moves to the front of the device with an alarm being issued and additionally the interlock of the reagent mounting unit cover 116 is released to notify the operator of attention (step S209). Note that, it is assumed that the operator does not notice the alarm even though the alarm has notified the operator of the attention. Therefore, after a certain period of time has elapsed, the reagent mounting unit 103 is desirably returned back to the reagent buffer 110 with the alarm being retained. Alternatively, a correction mechanism that automatically corrects the provision direction of the reagent bottle 10, may be provided to make a correction automatically.

Next, the reagent mounting unit 103 moves to a RFID detector and then the RFID sensor 115 reads information on the RFID tag 10a of the reagent bottle 10 so that the information on the reagent in the reagent bottle 10 is acquired (step S210).

Note that, the provision interval between the bottle orientation detecting sensor 114 and the RFID sensor 115 may be made to agree with the reagent bottle provision distance of the reagent mounting unit 103 so that the detection of the bottle orientation detecting sensor 114 and the measurement of the RFID sensor 115 may be simultaneously performed. Alternatively, the bottle orientation detecting sensor 114 may first detect the orientation of the bottle and whether the bottle has been provided, and then the RFID sensor 115 may measure a portion at which the provision has been made. In addition, the bottle orientation detecting sensor 114 and the RFID sensor 115 may be arranged at the same position so that the orientation and information of the reagent bottle 10 provided to the reagent mounting unit 103 may be simultaneously measured or may be sequentially measured.

In the description that has been given above, the operation of the autoloader mechanism 100 does not interfere with the operation of the analysis even in a case where the device is in the standby mode or in a case where the sample is being measured, so as to operate equivalently.

Based on the information acquired at step S210, it is determined whether the reagent bottle 10 is required to be carried in the reagent disk 9 (step S211). When it is determined that the reagent bottle 10 is required to be carried in, the processing proceeds to step S212. When it is determined that no carrying-in is required, the processing proceeds to step S221.

Figure 8:
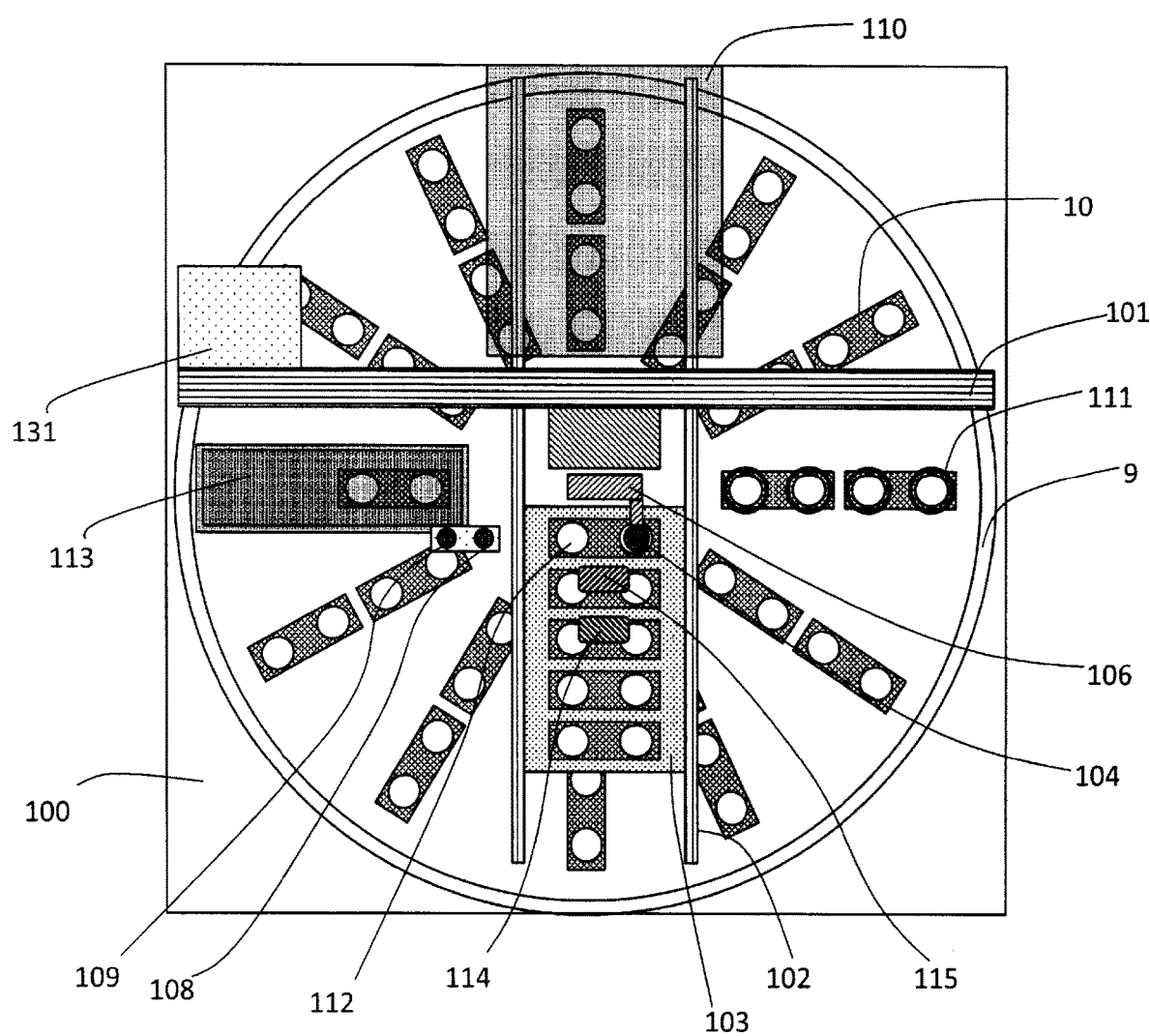
FIG. 8 is a schematic view for describing an exemplary operation of the autoloader mechanism provided to the automatic analyzer according to the embodiment of the present invention.

When it is determined at step S211 that the reagent bottle 10 is required to be carried in the reagent disk 9, as illustrated in FIG. 8, the reagent mounting unit 103 moves to a position below the reagent bottle lid opening mechanism 104 (step S212).

Next, the reagent bottle lid opening mechanism 104 descends toward the reagent bottle lid 112 of the reagent bottle 10, and then uses the needle 105 to make a degree of incision through which the reagent probes 7a and 8a can be inserted, in the bottle lid 112 (step S213).

After making the incision in the reagent bottle lid 112, the reagent bottle lid opening mechanism 104 ascends and then the reagent conveying mechanism 101 moves to the position of the needle cleaning tank 108 in order to clean the needle 105 so that the needle 105 is cleaned. After that, a movement is made to the needle drying port 109 so that the needle 105 is dried. Then, an incision is similarly made in the second reagent bottle lid 112 and then the needle 105 is cleaned and dried (step S214). Note that, according to the present embodiment, the reagent bottle lid 112 is two in number, but the same processing is performed even in a case where a plurality of the reagent bottle lids 112 is provided.

Figure 9:
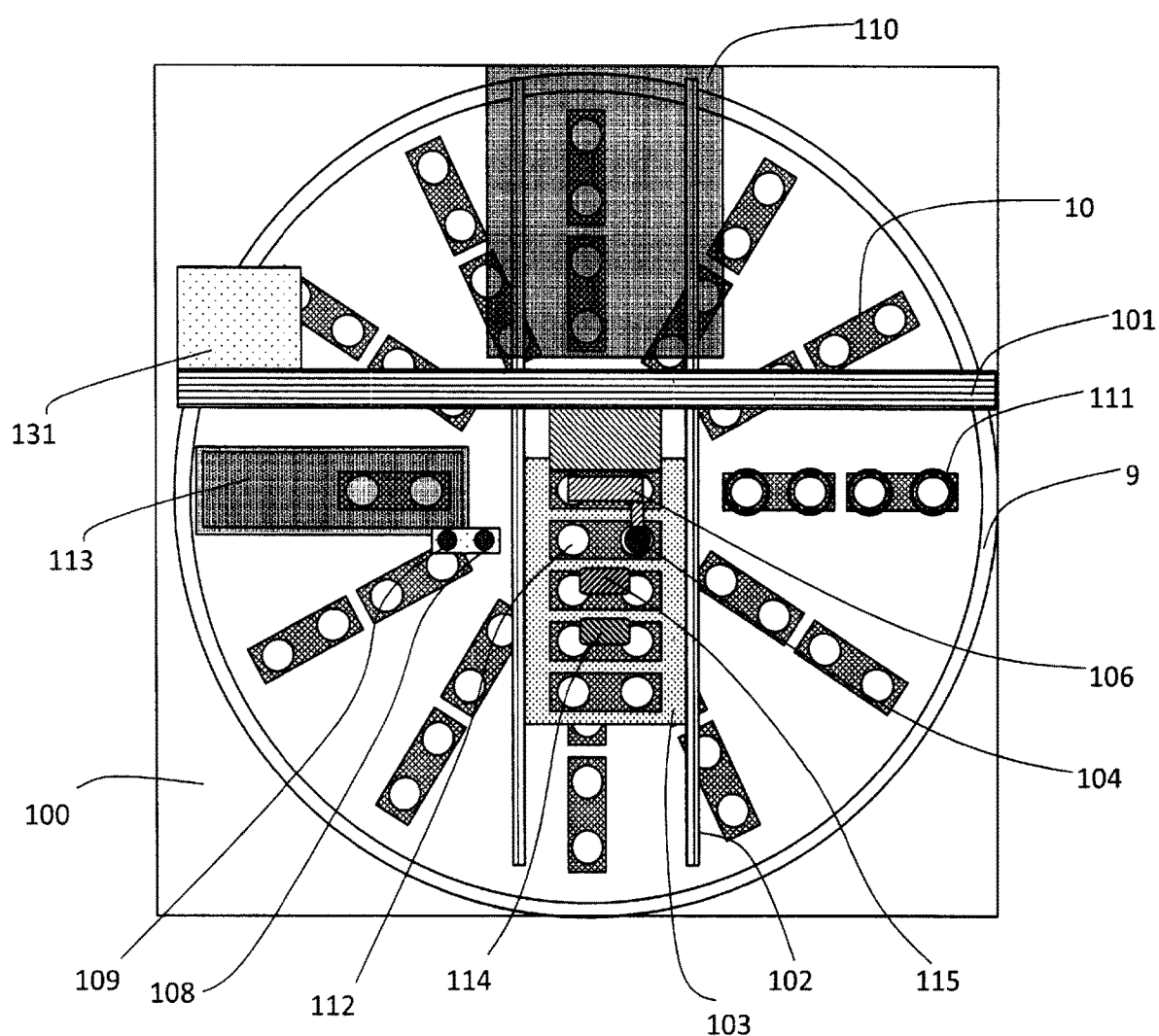
FIG. 9 is a schematic view for describing an exemplary operation of the autoloader mechanism provided to the automatic analyzer according to the embodiment of the present invention.

After the drying, the reagent mounting mechanism 102 again moves the reagent mounting unit 103 to a position below the gripper mechanism 106 (step S215). Specifically, as illustrated in FIG. 9, the reagent mounting mechanism 102 operates the reagent mounting unit 103 to move the reagent bottle 10 having the incision to the position below the gripper mechanism 106.

Figure 10:
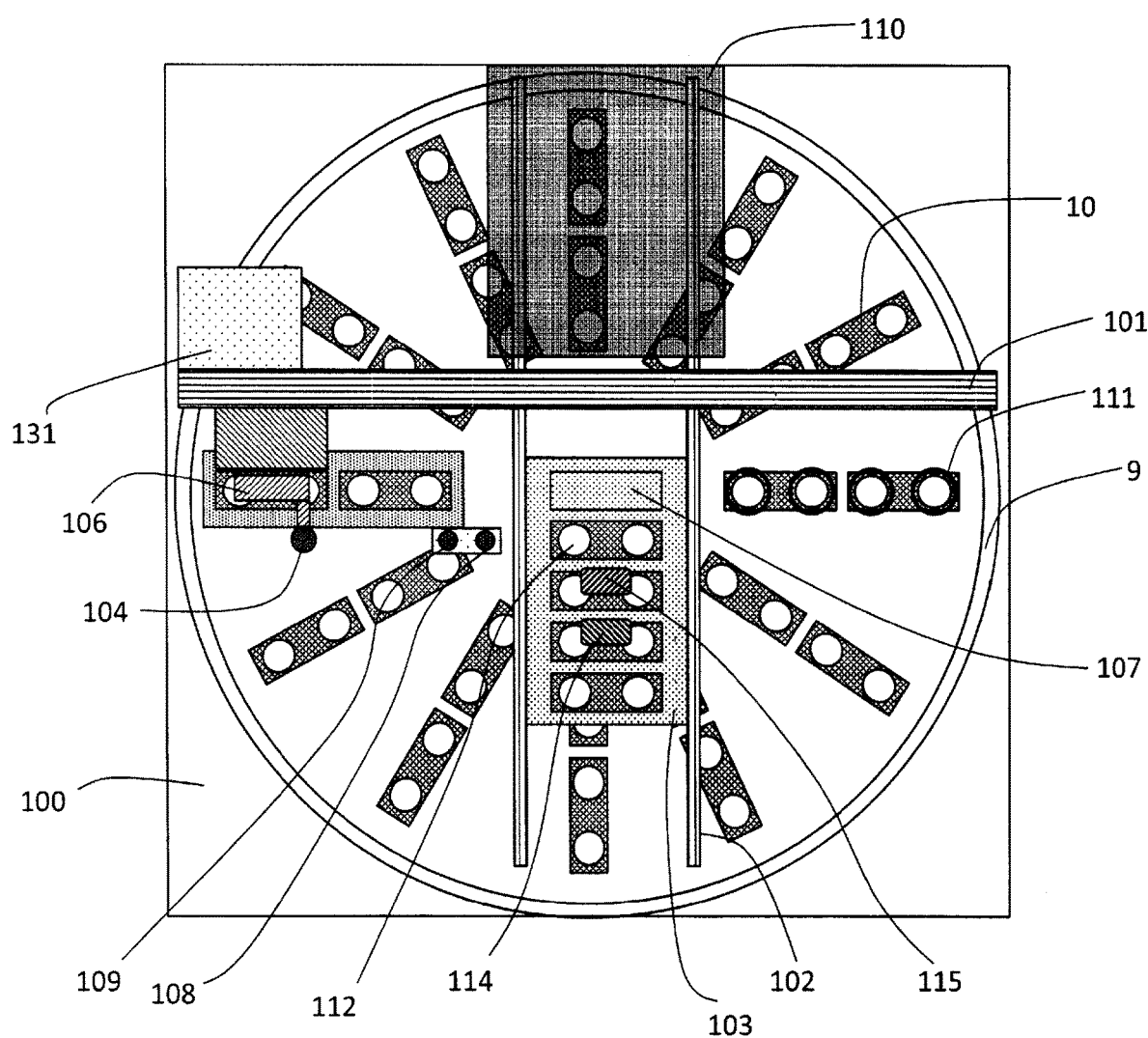
FIG. 10 is a schematic view for describing an exemplary operation of the autoloader provided to the automatic analyzer according to the embodiment of the present invention.

After that, the gripper mechanism 106 descends and holds the reagent bottle 10 (step S216), and then the reagent disk opening/closing cover 113 is opened (step S217). After that, the gripper mechanism 106 ascends and moves to the position of the reagent disk opening/closing cover 113 that has opened, so as to carry the reagent bottle 10 that has been conveyed, into an empty position of the reagent disk 9 as illustrated in FIG. 10 (step S218). After the carrying-in, the gripper mechanism 106 is returned back to the position of the reagent mounting unit 103 again (step S219).

In a case where the reagent bottle 10 is carried in the reagent disk 9 when the device is under the measurement, a unit that delays sample suction timing by one cycle is provided and then the carrying-in is desirably performed with an interval cycle so that the reagent conveying mechanism 101 can access the reagent disk 9. As a result, the reagent bottle 10 can be replaced with a processing speed being retained with only temporal loss corresponding to the interval cycle.

The operation having steps S215 to S219 above is repeatedly performed to all the reagent bottle 10 mounted on the reagent mounting unit 103, the reagent bottle 10 being required to be carried in the reagent disk 9. After all the reagent bottle 10 mounted on the reagent mounting unit 103, the reagent bottle 10 being required to be carried in, is carried in the reagent disk 9, the reagent disk opening/closing cover 113 is closed (step S220).

In a case where the reagent bottle 10 determined not to be required to be carried in the reagent disk 9 at step S211, is present, the reagent mounting unit 103 together with the reagent bottle 10 provided, is returned back to the inside of the reagent buffer 110 so that the reagent bottle 10 is on standby in the reagent buffer 110 (step S221). The reagent bottle 10 retained in the reagent buffer 110, has as necessary the reagent bottle lid 112 incised by the reagent bottle lid opening mechanism 104, and then is carried in the reagent disk 9 by the gripper mechanism 106.

The processing from steps S212 to S221 corresponds to a preliminary operation for the loading into the reagent disk.

In a case where the reagent bottle 10 has been provided to all the reagent bottle slots 107 of the reagent mounting unit 103 and in a case where a reagent bottle 10 provided in the reagent disk 9 has been emptied so as to be desirably discarded out of the device, at least one empty reagent bottle slot is provided for a providable count in the reagent disk 9. Then, the reagent bottle 10 provided to the reagent mounting unit 103 is carried in the reagent disk 9, with the reagent bottle lid 112 not incised. The gripper mechanism 106 holds the reagent bottle 10 that has been emptied, to mount the reagent bottle 10 that has been emptied, on the reagent mounting unit 103. After that, the operator carries the reagent bottle 10 that has been emptied, out. After the carrying-out, the reagent bottle 10 having no incision, provided in the reagent disk 9 can be returned back to the reagent bottle slot 107 that has been empty, again. A similar operation can be performed as long as an empty slot is provided to the reagent mounting unit 103.

Next, the positional relationship in the upper and lower direction between the reagent bottle lid opening mechanism 104 and the gripper mechanism 106 each in operation, will be described with FIGS. 11 to 14. First, FIG. 11 is a view illustrating a home position.

Figure 11:
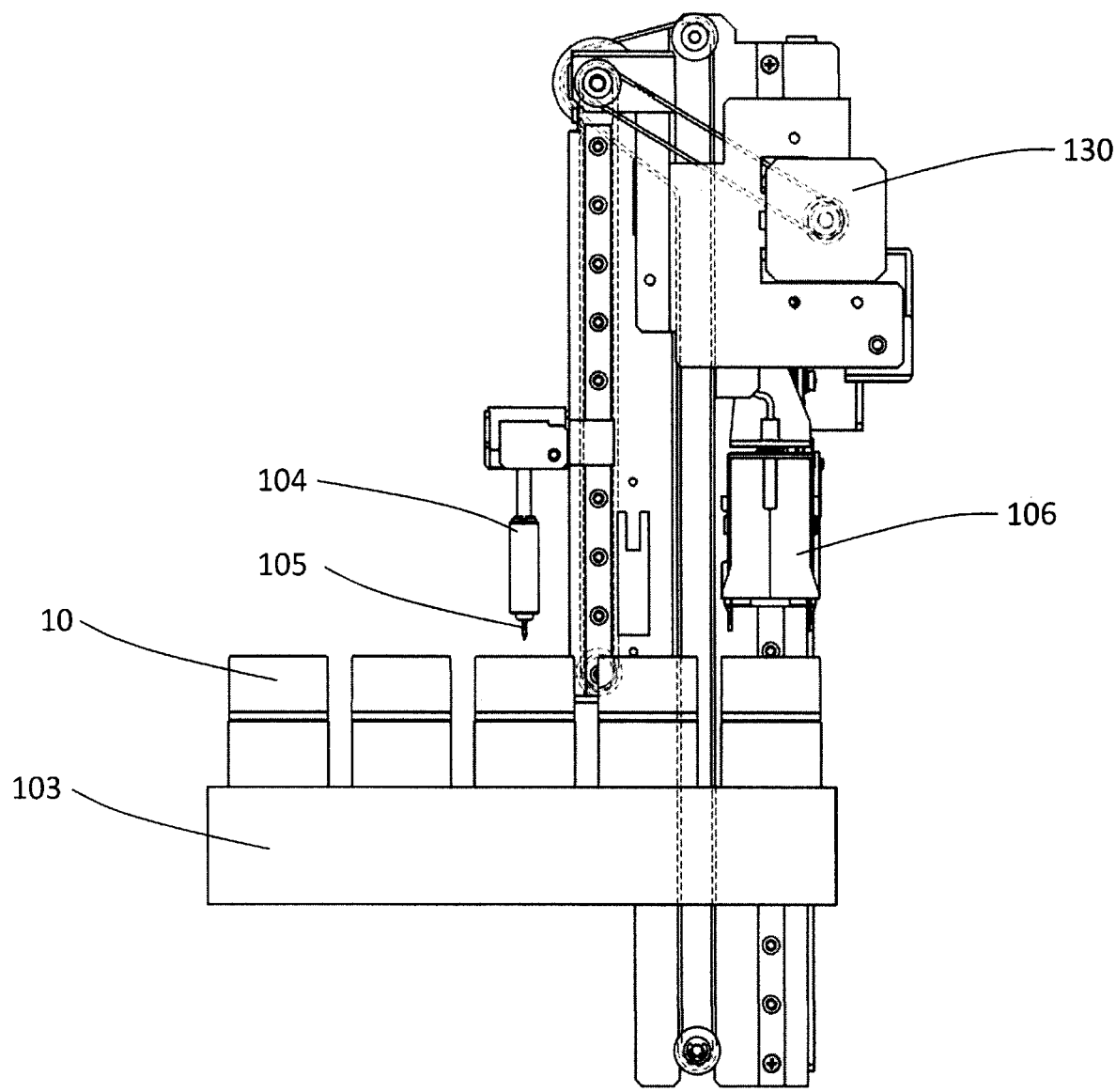
FIG. 11 is a schematic view for describing exemplary operations of the reagent bottle lid opening mechanism and the gripper mechanism in the automatic analyzer according to the embodiment of the present invention.

FIG. 11 illustrates the positional relationship in which the reagent bottle lid opening mechanism 104 and the gripper mechanism 106 are out of contact with the reagent bottle 10. That is, the reagent mounting unit 103 can move forward and backward at the home position.

Setting the home position of the reagent bottle lid opening mechanism 104 and the gripper mechanism 106 to the upper side of the reagent bottle 10, can perform the operation of incising the reagent bottle lid 112 and the operation of carrying the reagent bottle 10 in and out at the shortest moving distance. In addition, the reagent mounting unit 103 can operate forward and backward without interference with the reagent bottle lid opening mechanism 104 and the gripper mechanism 106 so that an arbitrary position at which the reagent bottle 10 has been provided to the reagent mounting unit 103, can be accessed.

In FIG. 11, the interval between the reagent bottle lid opening mechanism 104 and the gripper mechanism 106 is spaced by an interval corresponding to one reagent bottle 10, but the interval between the reagent bottle lid opening mechanism 104 and the gripper mechanism 106 depends on alteration of the arrangement of the constituent components. Thus, the interval between the reagent bottle lid opening mechanism 104 and the gripper mechanism 106 may be wider or narrower than the interval of the reagent bottle 10.

Figure 12:
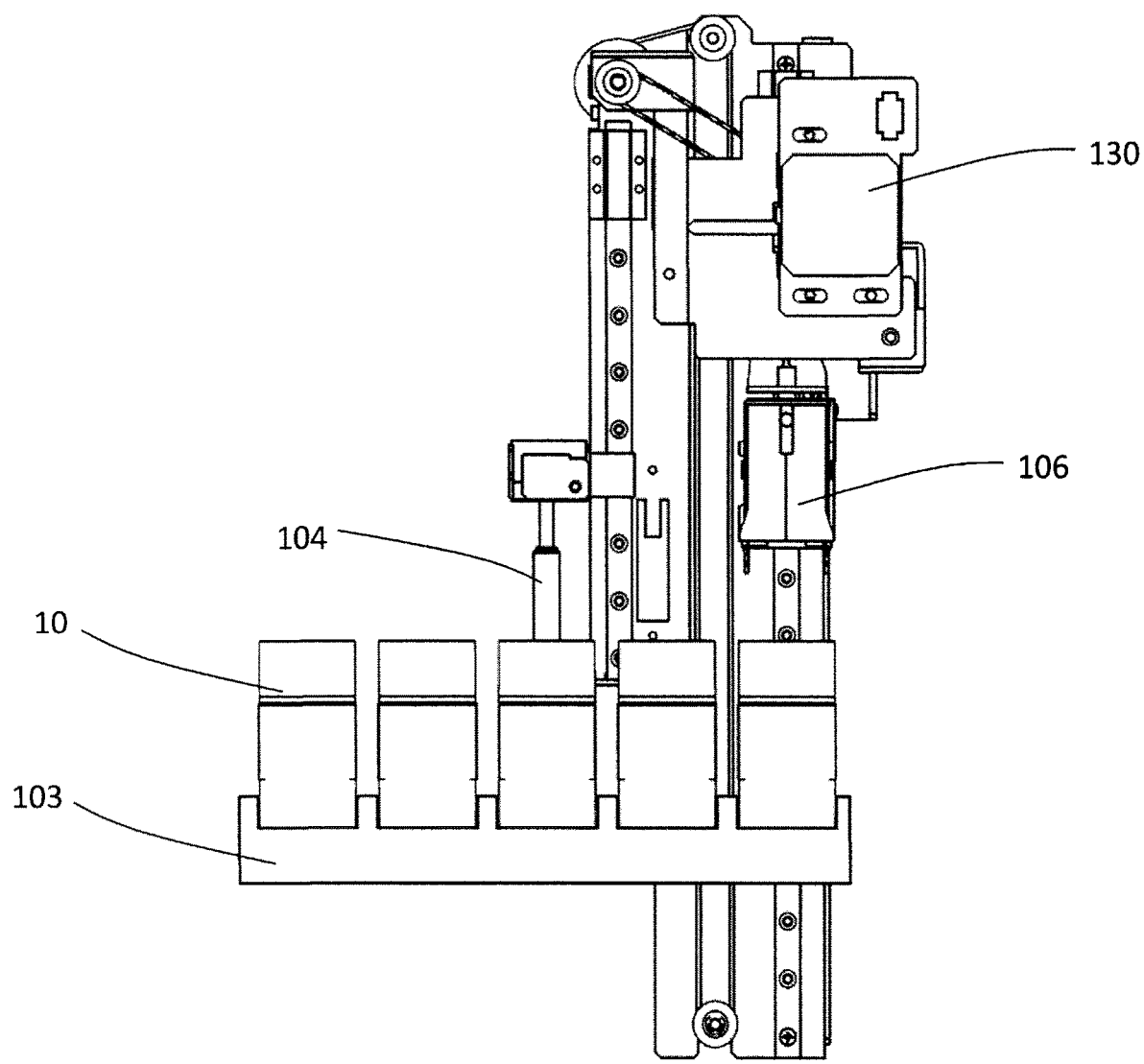
FIG. 12 is a schematic view for describing exemplary operations of the reagent bottle lid opening mechanism and the gripper mechanism in the automatic analyzer according to the embodiment of the present invention.

FIG. 12 is a view of the reagent bottle lid opening mechanism 104 that has descended in order to incise the reagent bottle lid 112 of the reagent bottle 10. In FIG. 12, the reagent bottle lid opening mechanism 104 descends so that the gripper mechanism 106 operates above the home position in coordination. After the reagent bottle lid 112 is incised, the reagent conveying mechanism 101 moves to the needle cleaning tank 108 and the needle drying port 109 to clean and dry the needle 105. At this time, the reagent bottle lid opening mechanism 104 operates upward and downward so that the needle 105 is efficiently cleaned and dried.

Figure 13:
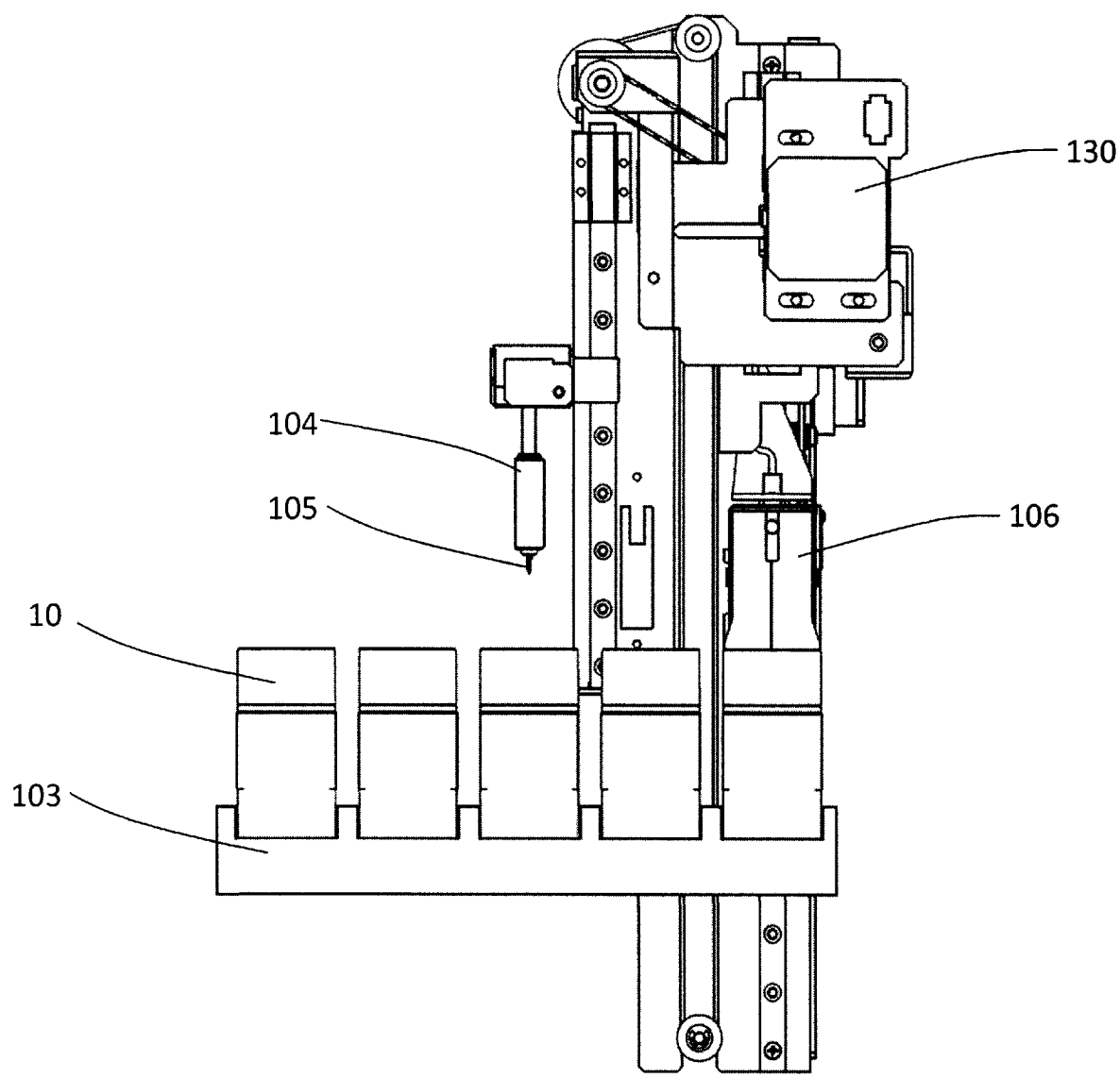
FIG. 13 is a schematic view for describing exemplary operations of the reagent bottle lid opening mechanism and the gripper mechanism in the automatic analyzer according to the embodiment of the present invention.

FIG. 13 is a view of the gripper mechanism 106 that has descended in order to hold the reagent bottle 10. In FIG. 13, the gripper mechanism 106 descends so that the reagent bottle lid opening mechanism 104 moves above the home position in coordination.

Figure 14:
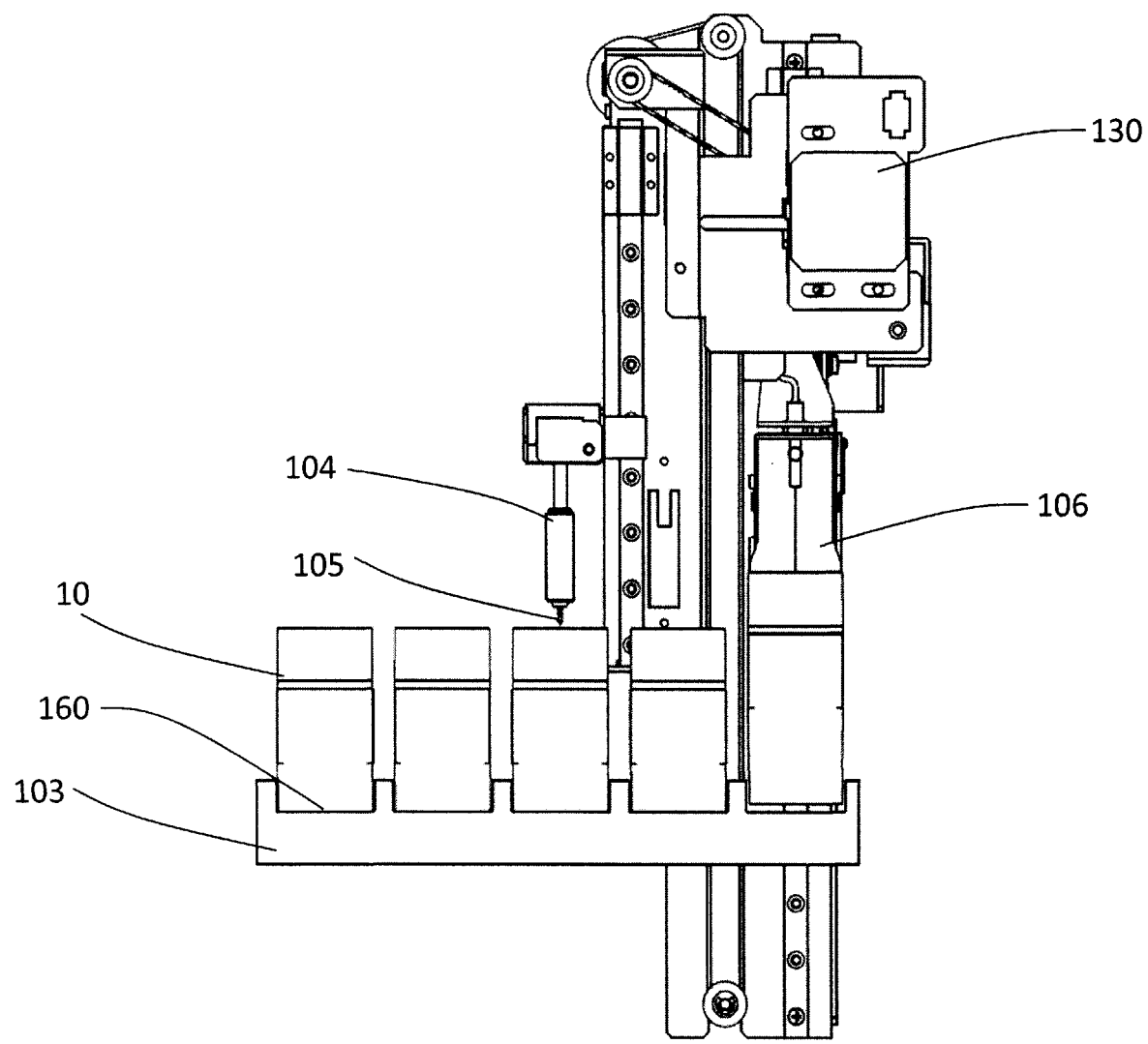
FIG. 14 is a schematic view for describing exemplary operations of the reagent bottle lid opening mechanism and the gripper mechanism in the automatic analyzer according to the embodiment of the present invention.

FIG. 14 is a view of the reagent bottle 10 lifted by the gripper mechanism 106. In FIG. 14, the reagent mounting unit 103 has a notch 160 so that the reagent bottle 10 can move with a minimum lifting amount from the reagent mounting unit 103. At this time, a positional relationship in the upper and lower direction is provided so that the reagent bottle lid opening mechanism 104 moves lower than that in FIG. 13 but the needle 105 of the reagent bottle lid opening mechanism 104 is out of contact with the reagent bottle 10.

Figure 15:
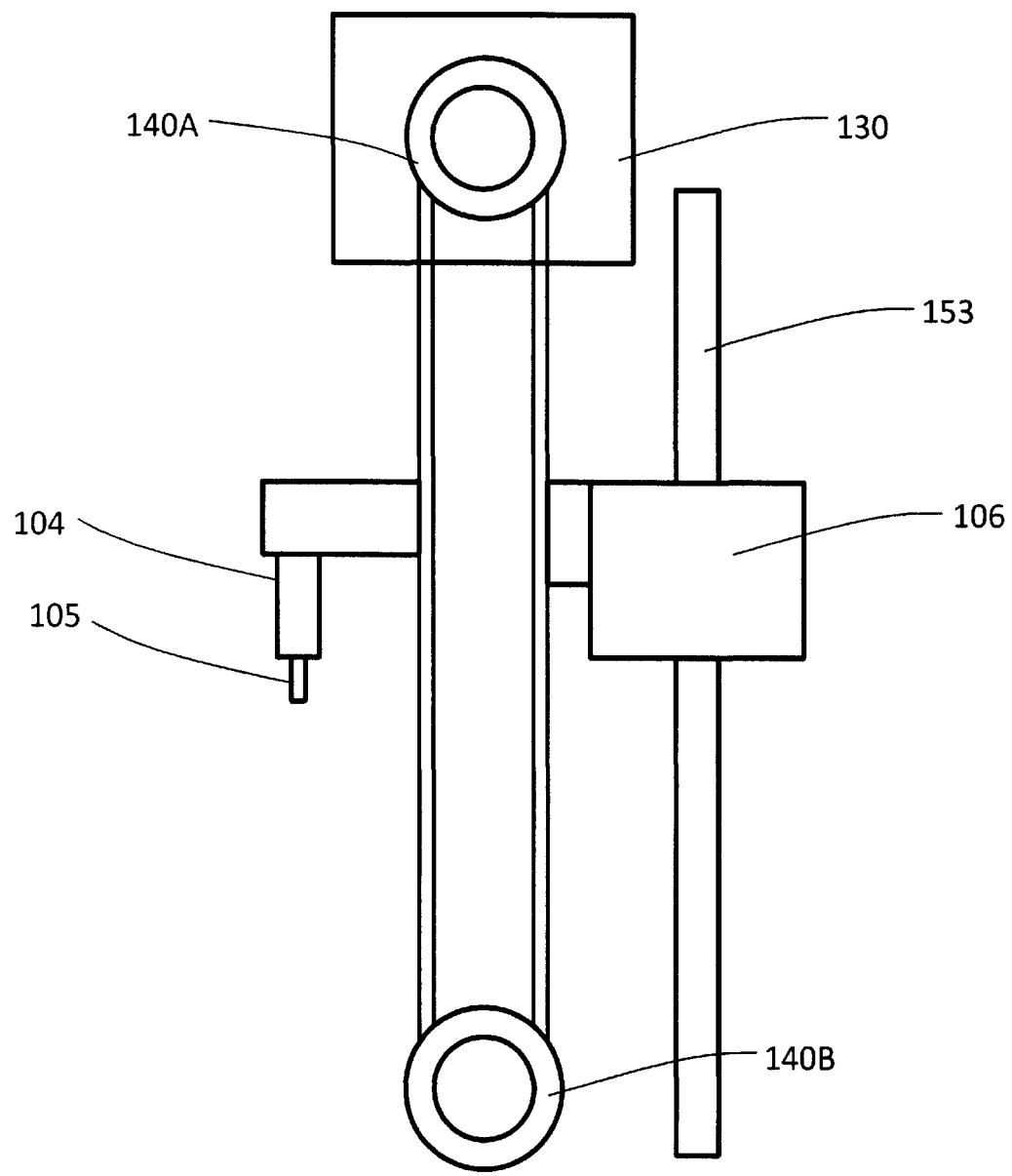
FIG. 15 is a schematic view for describing exemplary configurations of a reagent bottle lid opening mechanism and a gripper mechanism in a different mode of the automatic analyzer according to the present invention.
Figure 16:
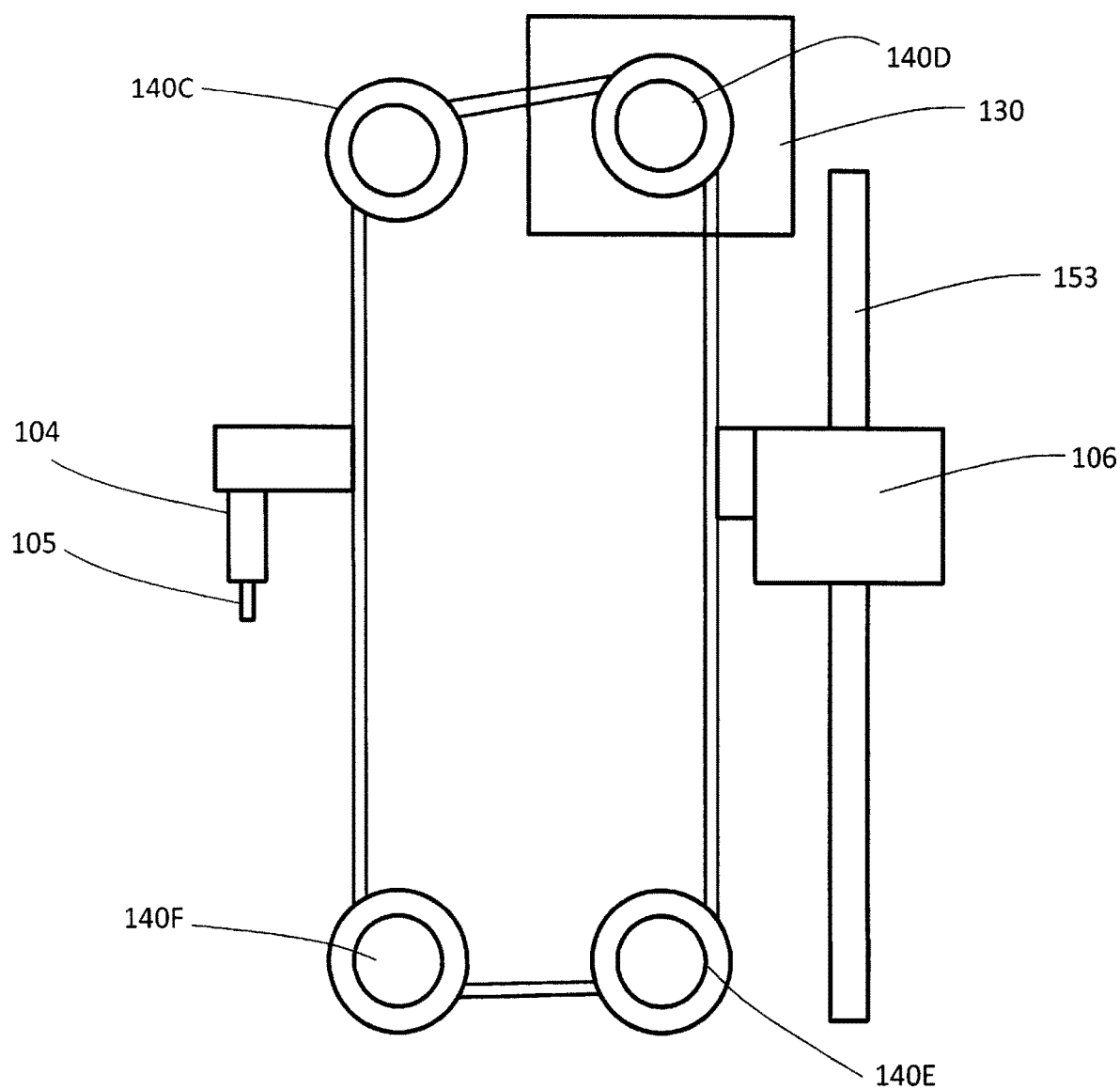
FIG. 16 is a schematic view for describing exemplary configurations of a reagent bottle lid opening mechanism and a gripper mechanism in a different mode of the automatic analyzer according to the present invention.

Note that, as illustrated in FIG. 15, even when one linear guide 153 is provided, for example, a gripper mechanism 106 and a reagent bottle lid opening mechanism 104 can be provided on the right side and left side of a belt in FIG. 15, respectively. In this case, varying pulleys 140A and 140B in diameter can set the reagent bottle lid opening mechanism 104 and the gripper mechanism 106 in position at a necessary distance. As illustrated in FIG. 16, making an offset with pulleys 140C, 140D, 140E, and 140F, can adjust the interval between the reagent bottle lid opening mechanism 104 and the gripper mechanism 106 to a desired interval or can vary the reagent bottle lid opening mechanism 104 and the gripper mechanism 106 in the amount of movement in the upper and lower direction.

Figure 17:
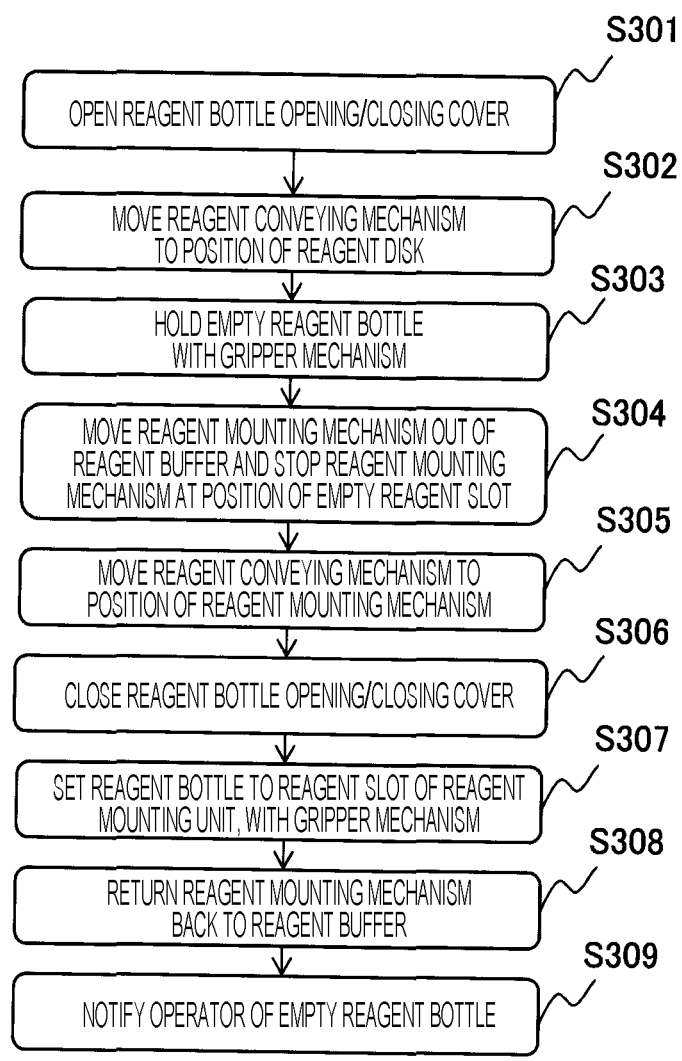
FIG. 17 is a flowchart for describing a reagent carrying-out operation in the automatic analyzer according to the embodiment of the present invention.

In a case where the reagent provided in the reagent disk 9 becomes empty, the reagent bottle 10 is carried out in accordance with a flow in FIG. 17. The carrying-out timing of the reagent bottle 10 as illustrated in FIG. 17 may be performed after the reagent dispensing mechanism 8 completes the last dispensing even during the analysis, or after an analysis result is output.

In FIG. 17, the reagent conveying mechanism 101 first opens the reagent disk opening/closing cover 113 (step S301). The reagent conveying mechanism 101 moves to the position of the reagent disk opening/closing cover 113 that has opened (step S302).

Next, the gripper mechanism 106 holds the reagent bottle 10 that has been empty (step S303). Simultaneously, the reagent mounting mechanism 102 moves out of the reagent buffer 110 and then stops above the position of the reagent bottle slot 107 that has been empty in the reagent mounting unit 103 (step S304).

Next, in a state where the gripper mechanism 106 has held the reagent bottle 10 that has been empty, the reagent conveying mechanism 101 moves to the position of the reagent mounting mechanism 102 (step S305). Simultaneously with this, the reagent disk opening/closing cover 113 is closed (step S306).

After that, the gripper mechanism 106 sets the reagent bottle 10 that has been empty, in the reagent bottle slot 107 that has been empty, in the reagent mounting unit 103 (step S307). After that, the reagent mounting mechanism 102 returns back to the reagent buffer 110 (step S308).

After that, the operator is notified that the reagent bottle 10 that has been empty can be taken out (step S309). When receiving the notification, the operator takes the reagent bottle 10 that has been empty, out of the device.

Note that, according to the present embodiment, the gripper mechanism 106, the carrying-in position of the reagent disk, and the reagent nozzle suction port 111 are linearly arranged, but are not limited to the arrangement. The reagent nozzle suction port is required at least to be in a range in which the reagent probes 7a and 8a can operate.

According to the present embodiment, one number of the needle 105 has been described. However, in a case where two number of the lids of the reagent in position are provided similarly to the reagent bottle 10, two number of the needles 105 are attached at the interval between holes of the lids of the reagent and then, as a first operation, the descending operation of the reagent bottle lid opening mechanism 104 simultaneously makes the holes in the two number of the lids. In addition, two number of the needle cleaning tanks 108 and two number of the needle drying ports 109 are each provided at the interval between the needles 105. As a result, one upward and downward operation can perform cleaning and one upward and downward operation can perform drying so that shortening in carrying-in time can be achieved.

According to the present embodiment, the description in which the gripper mechanism 106 and the reagent bottle lid opening mechanism 104 operate in the upper and lower direction with the upward and downward drive motor 130 and operate in the left and right direction with the horizontal drive motor 131, has been given. However, a forward and backward motor is added to achieve the operations in the three directions so that the providable quantity of the reagent bottle 10 that can be provided to the reagent mounting unit 103, can increase.

Next, an effect according to the present embodiment will be described.

In the automatic analyzer according to the embodiment of the present invention described above, one actuator (the gripper mechanism and reagent bottle lid opening mechanism drive unit 120) coordinates and drives the gripper mechanism 106 that holds the reagent bottle 10 and the reagent bottle lid opening mechanism 104 that incises the lid of the reagent bottle 10, in the upper and lower direction. The gripper mechanism 106 operates to ascend when the reagent bottle lid opening mechanism 104 operates to descend in order to incise the reagent bottle lid 112, and the reagent bottle lid opening mechanism 104 operates to ascend when the gripper mechanism 106 operates to descend in order to hold the reagent bottle 10. Thus, the reagent bottle lid opening mechanism 104 and the gripper mechanism 106 operate without interfering with each other's functions.

In this manner, the one actuator drives the reagent bottle lid opening mechanism 104 and the gripper mechanism 106 in the reverse directions so that the reagent bottle lid opening mechanism 104 and the gripper mechanism 106 are not each required to have an individual mechanism. As a result, the number of the components can be reduced. Furthermore, improvement in adjustment and maintainability and miniaturization of the provision space of the device, can be achieved.

In addition, the risk of unnecessarily incising the lid 112 of the reagent bottle 10 can be reduced in comparison to a case where the reagent bottle lid opening mechanism 104 and the gripper mechanism 106 integrally move upward and downward. For the integrally upward and downward operation, reducing the reagent bottle 10 in loading quantity can perform an operation without interference. Since the reagent bottle 10 in the loading quantity decreases, the operation and time in which the operator fills the reagent increases in quantity. However, the present invention has no such concern.

Note that, the present invention is not limited to the embodiment and thus various modifications and applications may be made. The embodiment has been described in detail in order to easily understand the present invention. The present invention is not necessarily limited to including all the configurations that have been described.

REFERENCE SIGNS LIST 1 reaction disk
2 reaction container
3 cleaning mechanism
4 spectrophotometer
4a light source
5 stirring mechanism
6 stirring mechanism
7, 8 reagent dispensing mechanisms
7a, 8a reagent probes
9 reagent disk
10 reagent bottle
10a RFID tag
11 sample dispensing mechanism
11a sample probe
13 cleaning tank
15 sample container
16 rack
17 sample conveying mechanism
18 reagent syringe
19 sample syringe
20 cleaning pump
21 controller
30 cleaning tank for stirring mechanism
31 cleaning tank for stirring mechanism
32 cleaning tank for reagent dispensing mechanism
33 cleaning tank for reagent dispensing mechanism
100 autoloader mechanism
101 reagent conveying mechanism (reagent conveying unit) (movement in X direction)
102 reagent mounting mechanism (tray mechanism)
103 reagent mounting unit (tray)
104 reagent bottle lid opening mechanism (reagent bottle lid opening unit)
105 needle (piercing)
106 gripper mechanism (gripper unit)
107 reagent bottle slot (reagent bottle providable)

108 needle cleaning tank
109 needle drying port
110 reagent buffer
111 reagent nozzle suction port
112 reagent bottle lid
113 reagent disk opening/closing cover
114 bottle orientation detecting sensor (discriminating sensor)
115 RFID sensor
116 reagent mounting unit cover
120 gripper mechanism and reagent bottle lid opening mechanism drive unit (gripper unit and reagent bottle lid opening unit drive unit)
130 upward and downward drive motor
131 horizontal drive motor
141 belt A (first belt)
142 belt B (second belt)
143 belt C (third belt)
145 pulley A (first pulley)
146 pulley B
147 pulley C
147a first pulley portion (second pulley)
147b second pulley portion (third pulley)
148 pulley D
149 pulley E
151 linear guide A (first linear guide)
152 linear guide B (second linear guide)
153 linear guide
160 notch

The invention claimed is:

1. An automatic analyzer configured to dispense a sample and a reagent to each of a plurality of reaction containers to react the sample and the reagent, the automatic analyzer configured to measure a liquid that has reacted, the automatic analyzer comprising:
a reagent disk configured to store a reagent bottle that has housed the reagent;
a reagent mounting unit configured to be provided with the reagent bottle in loading the reagent bottle into the automatic analyzer; and
a reagent conveying unit including a gripper unit that holds the reagent bottle and a reagent bottle lid opening unit that makes a hole in a lid of the reagent bottle, the reagent conveying unit configured to convey the reagent bottle that has been provided to the reagent mounting unit, into the reagent disk,
wherein a gripper unit and reagent bottle lid opening unit drive unit is configured to coordinate and drive the gripper unit and the reagent bottle lid opening unit in the reagent conveying unit, so that when the reagent bottle opening unit moves in an upper or lower direction, the gripper unit simultaneously moves in the lower or upper direction reversely to the reagent bottle lid opening unit.

2. The automatic analyzer according to claim 1, wherein the gripper unit and reagent bottle lid opening unit drive unit includes:
an upward and downward drive motor;
a first belt coupled to the upward and downward drive motor;
a first pulley configured to rotate in coordination with the upward and downward drive motor through the first belt;
a second pulley and a third pulley coaxial with the first pulley;
a second belt coupled to the second pulley and the reagent bottle lid opening unit;
a third belt coupled to the third pulley and the gripper unit;
a first linear guide configured to guide the reagent bottle lid opening unit in a vertical direction; and
a second linear guide configured to guide the gripper unit in the vertical direction.

3. The automatic analyzer according to claim 2, wherein a diameter of the second pulley is different from a diameter of the third pulley.

4. The automatic analyzer according to claim 3, wherein the diameter of the third pulley is larger than the diameter of the second pulley.

5. The automatic analyzer according to claim 2, wherein the first linear guide and the second linear guide are arranged in parallel.

6. The automatic analyzer according to claim 1, wherein the reagent bottle lid opening unit is positioned above the gripper unit when the gripper unit holds the reagent bottle, and the gripper unit is positioned above the reagent bottle lid opening unit when the reagent bottle lid opening unit opens the lid of the reagent bottle.

7. The automatic analyzer according to claim 6, wherein the reagent bottle lid opening unit is arranged out of contact with the lid of the reagent bottle when the gripper unit holds the reagent bottle.

8. The automatic analyzer according to claim 1, wherein a horizontal operation direction of the reagent mounting unit is orthogonal to a horizontal operation direction of the reagent conveying unit.

9. The automatic analyzer according to claim 1, wherein the reagent conveying unit has a position at which the gripper unit holds the reagent bottle and a position at which the reagent bottle is carried in or carried out of the reagent disk, arranged linearly.

10. The automatic analyzer according to claim 1, wherein a cleaning tank that cleans the reagent bottle lid opening unit and a drying port that removes cleaning water after the cleaning in the cleaning tank, are arranged in parallel to the reagent conveying unit.

11. The automatic analyzer according to claim 1, wherein the reagent mounting unit is providable with a plurality of the reagent bottles linearly.

12. The automatic analyzer according to claim 1, further comprising:
a reagent buffer configured to retain the reagent bottle.

13. The automatic analyzer according to claim 12, further comprising:
a discriminating sensor configured to discriminate the reagent bottle in orientation; and
a RFID sensor configured to read information on a RFID tag provided to the reagent bottle,
wherein the reading of the RFID tag is performed after the discriminating sensor discriminates the orientation.

14. The automatic analyzer according to claim 13, wherein the reagent conveying unit houses the reagent bottle into the reagent buffer after the RFID sensor reads the information on the RFID tag of the reagent bottle.

15. The automatic analyzer according to claim 14, wherein, after the RFID sensor reads the information on the RFID tag of the reagent bottle, the reagent conveying unit incises the lid of the reagent bottle with the reagent bottle lid opening unit so as to carry the reagent bottle into the reagent disk.

* * * * *